Dec. 11, 1951   R. H. HALVORSEN   2,578,185
CARD PUNCH CONTROL SYSTEM
Filed Oct. 2, 1948   15 Sheets-Sheet 1

INVENTOR
RALPH H. HALVORSEN
BY Emery Robinson
ATTORNEY

Dec. 11, 1951  R. H. HALVORSEN  2,578,185
CARD PUNCH CONTROL SYSTEM
Filed Oct. 2, 1948  15 Sheets-Sheet 2

INVENTOR
RALPH H. HALVORSEN
BY Emery Robinson
ATTORNEY

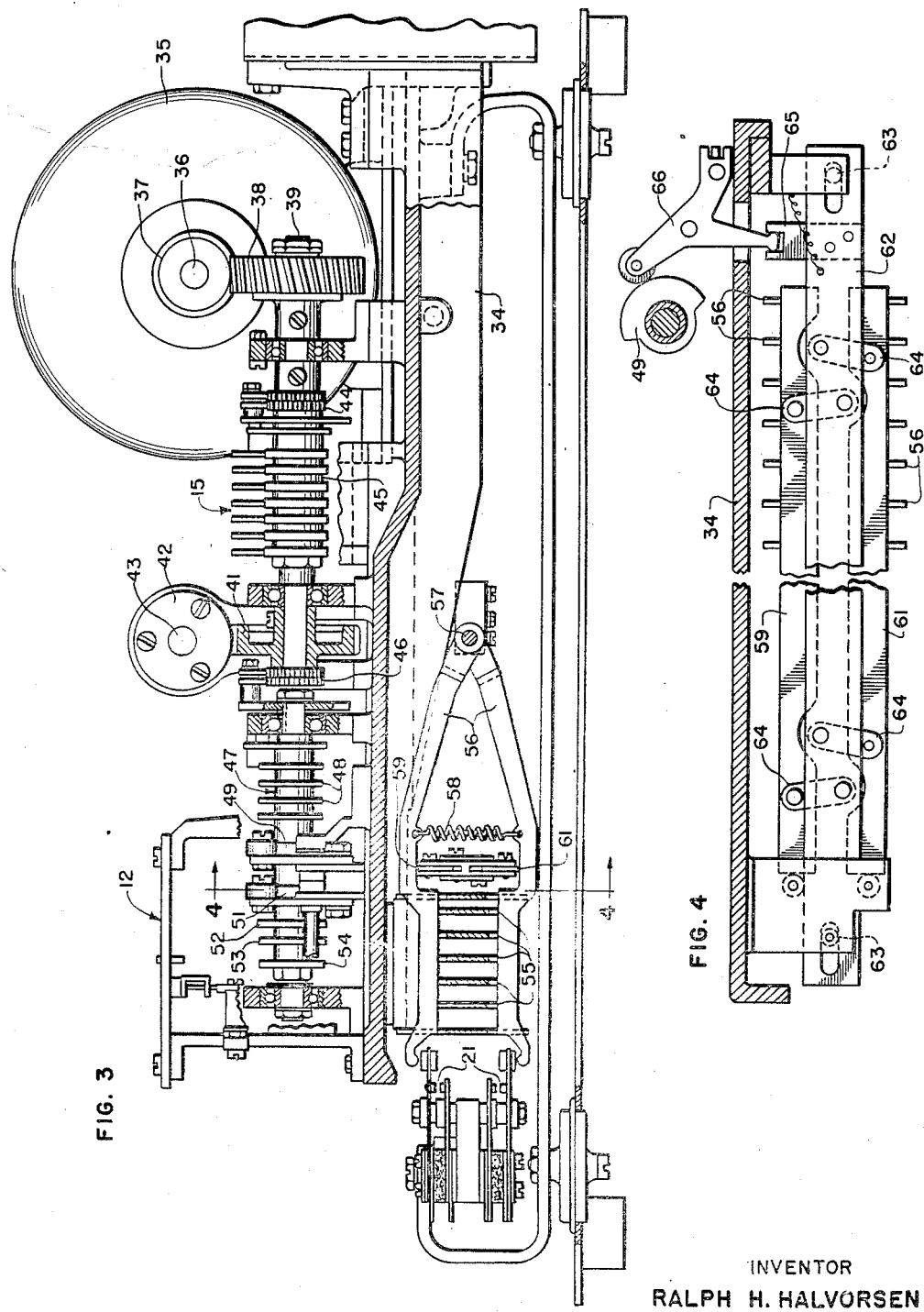

Dec. 11, 1951  R. H. HALVORSEN  2,578,185
CARD PUNCH CONTROL SYSTEM
Filed Oct. 2, 1948  15 Sheets-Sheet 4

INVENTOR
RALPH H. HALVORSEN
BY Emery Robinson
ATTORNEY

Dec. 11, 1951 — R. H. HALVORSEN — 2,578,185

CARD PUNCH CONTROL SYSTEM

Filed Oct. 2, 1948 — 15 Sheets-Sheet 5

INVENTOR
RALPH H. HALVORSEN
BY Emery Robinson
ATTORNEY

INVENTOR
RALPH H. HALVORSEN
BY Emery Robinson
ATTORNEY

Dec. 11, 1951  R. H. HALVORSEN  2,578,185
CARD PUNCH CONTROL SYSTEM
Filed Oct. 2, 1948  15 Sheets-Sheet 10

INVENTOR
RALPH H. HALVORSEN
BY Emery Robinson
ATTORNEY

INVENTOR
RALPH H. HALVORSEN
BY Emery Robinson
ATTORNEY

Dec. 11, 1951 R. H. HALVORSEN 2,578,185
CARD PUNCH CONTROL SYSTEM
Filed Oct. 2, 1948 15 Sheets-Sheet 14
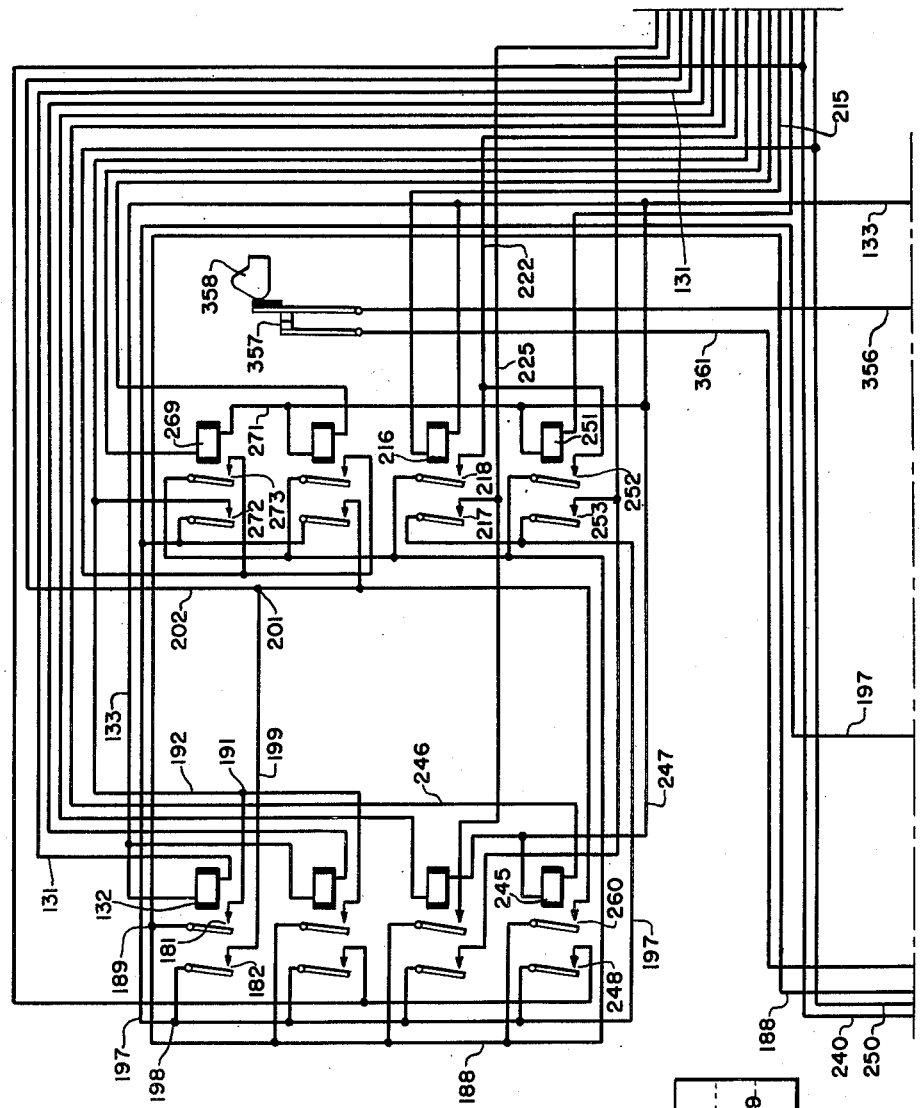
INVENTOR
RALPH H. HALVORSEN
BY Emery Robinson
ATTORNEY

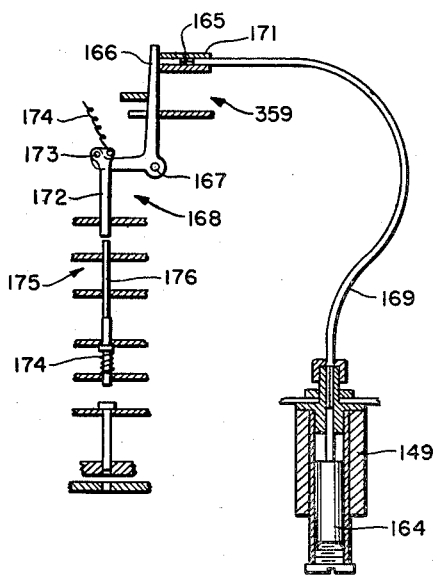
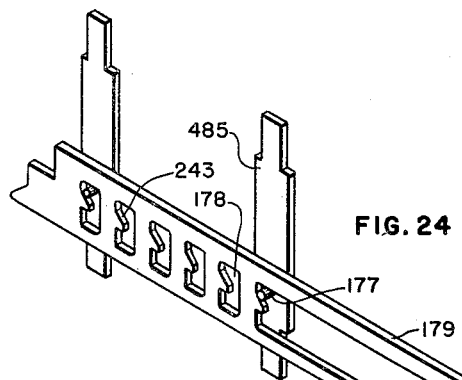
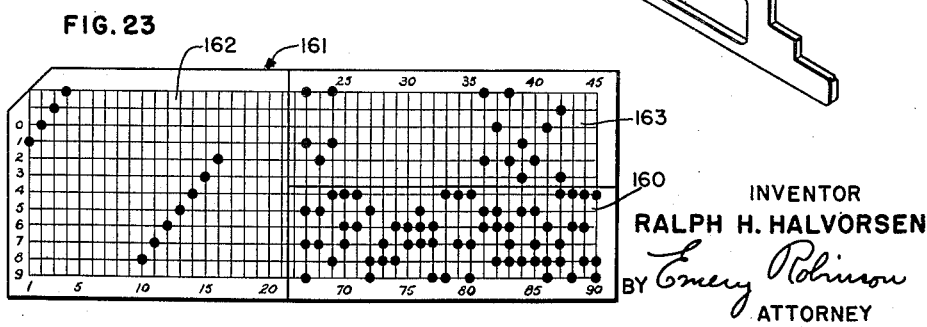

Patented Dec. 11, 1951

2,578,185

UNITED STATES PATENT OFFICE 2,578,185

CARD PUNCH CONTROL SYSTEM

Ralph Henry Halvorsen, Chicago, Ill., assignor to Teletype Corporation, Chicago, Ill., a corporation of Delaware Application October 2, 1948, Serial No. 52,520

6 Claims. (Cl. 178—2)

This invention pertains to control systems and apparatus for effecting the automatic operation of tabulating card punch machines and which is particularly applicable for use in connection with telegraph systems.

A primary object of the invention is to control automatically tabulating card apparatus in response to incoming line signals.

Another object of the invention is to provide revertive control between card punch operating apparatus and control mechanisms therefor.

Another object is to provide a converter unit for translating telegraphic code signals into statistical code for operating statistical code card punching machines.

According to the invention, a perforated tape is prepared on a tape reperforator in response to code signals received over a telegraph line. The tape is then inserted in the tape sensing or record reading portion of a translator unit or converter comprising a plurality of feeler members each one of which corresponds to a position in the tape that may or may not be provided with a perforation, depending upon the particular code combination that is being read. Upon each momentary arrest of the control form the several tape feelers sense the code combination perforated in the particular positions, and upon the next movement the combination is transferred to an intermediate set of storage devices following which a set of code bars are also positioned in accordance with such code combination. The code bars are provided with notches on both top and bottom edges thereof and in this manner they accommodate a double alignment of selectable elements. In the preferred practice of the present invention the selectable elements are alternately and oppositely disposed with respect to each other in scissors-like fashion constituting two rows which are movable toward each other when urged into selected position. For each permutation of the code bars one and only one of these selectable elements may be placed into selected position and when any particular one is thus selected it acts to close an electrical contact associated therewith.

These electrical contacts are analogous to the alphabet and function keys of a manually operated keyboard, wherein the contacts are operated by the keys. The alphabetic contacts are wired either directly or through a letters-figures shift contact mechanism to a slip connection block, through which electrical connection is made to the card punch operating apparatus. Timing contacts and function control relays are also provided in the converter unit for governing the operation of the card apparatus.

A more comprehensive understanding of the present invention may be had from the following description taken in conjunction with the accompanying drawings, wherein:

Fig. 3 is a side view, partly in section, of the translating unit shown in Fig. 2;

Fig. 4 is a sectional view taken on line 4—4 of Fig. 3;

Figure 13:
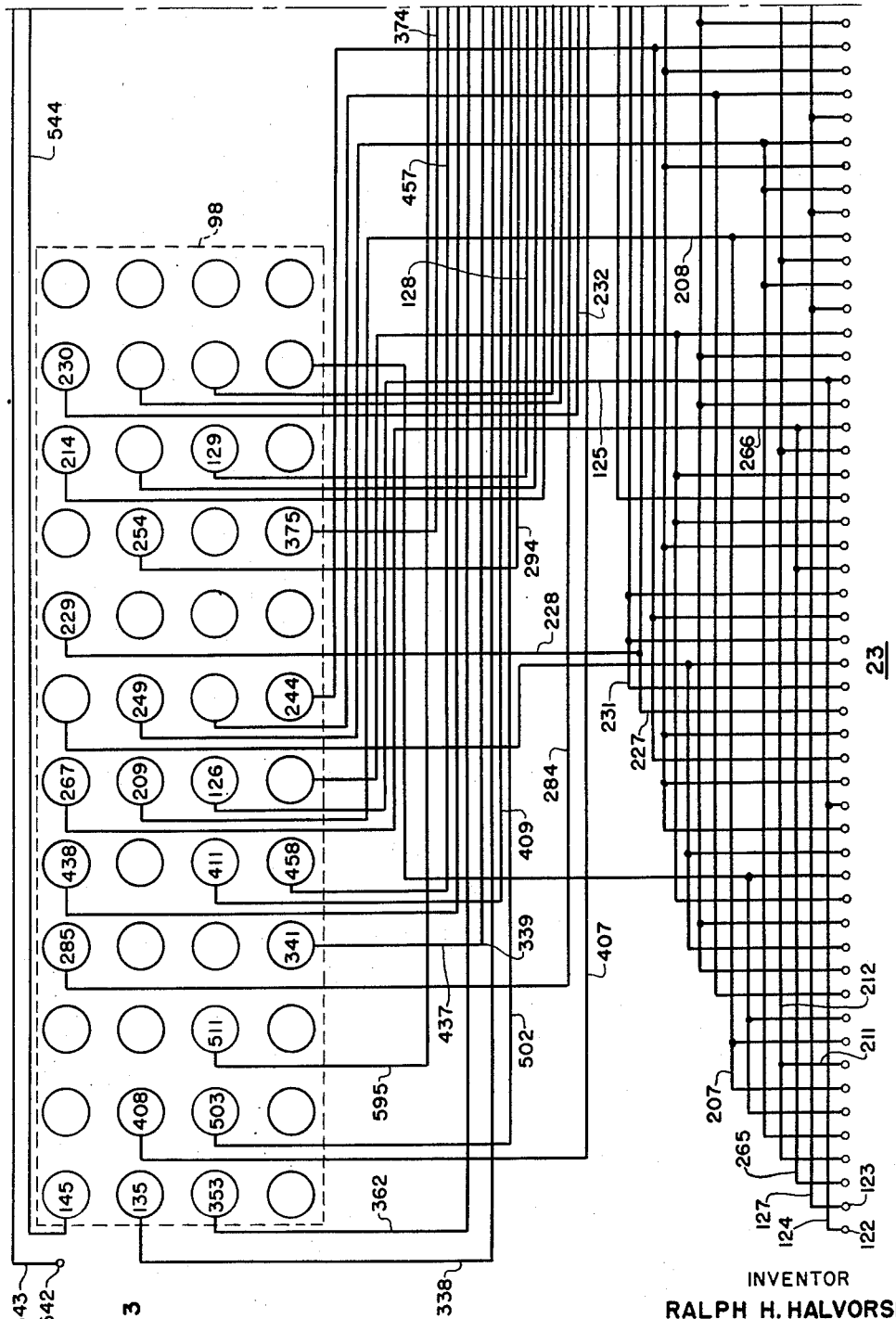
Figure 15:
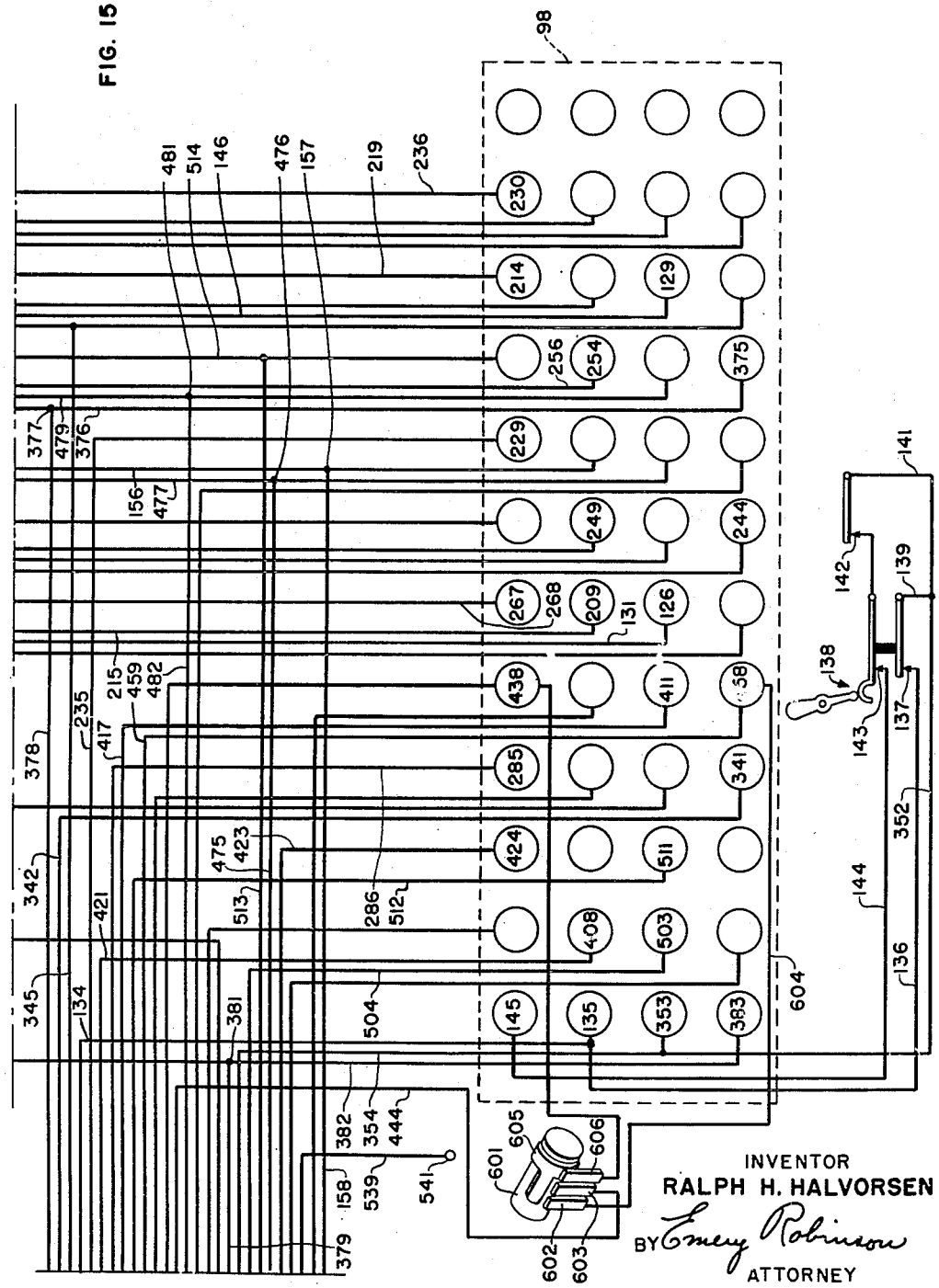

Figs. 9 to 14, inclusive, are component parts of an electrical circuit arrangement associated with the translating unit according to the present invention;

Figs. 15 to 18, inclusive, are component parts of an electrical circuit arrangement associated with the card punch apparatus;

Fig. 19 is a view showing the relative arrangement of Figs. 9 to 14, inclusive;

Fig. 20 is a view showing the relative arrangement of Figs. 15 to 18, inclusive;

Fig. 21 is a view showing the relative arrangement of Figs. 19 and 20, wherein Fig. 15 is superimposed upon Fig. 13;

Fig. 22 is a diagrammatic view showing the train of connections from the associated magnet for setting one of the punches in the card punch unit;

Fig. 23 is a plan view of one form of card for use in connection with the present invention; and Fig. 24 is a detail perspective view showing the locking slide mechanism.

Figure 1:
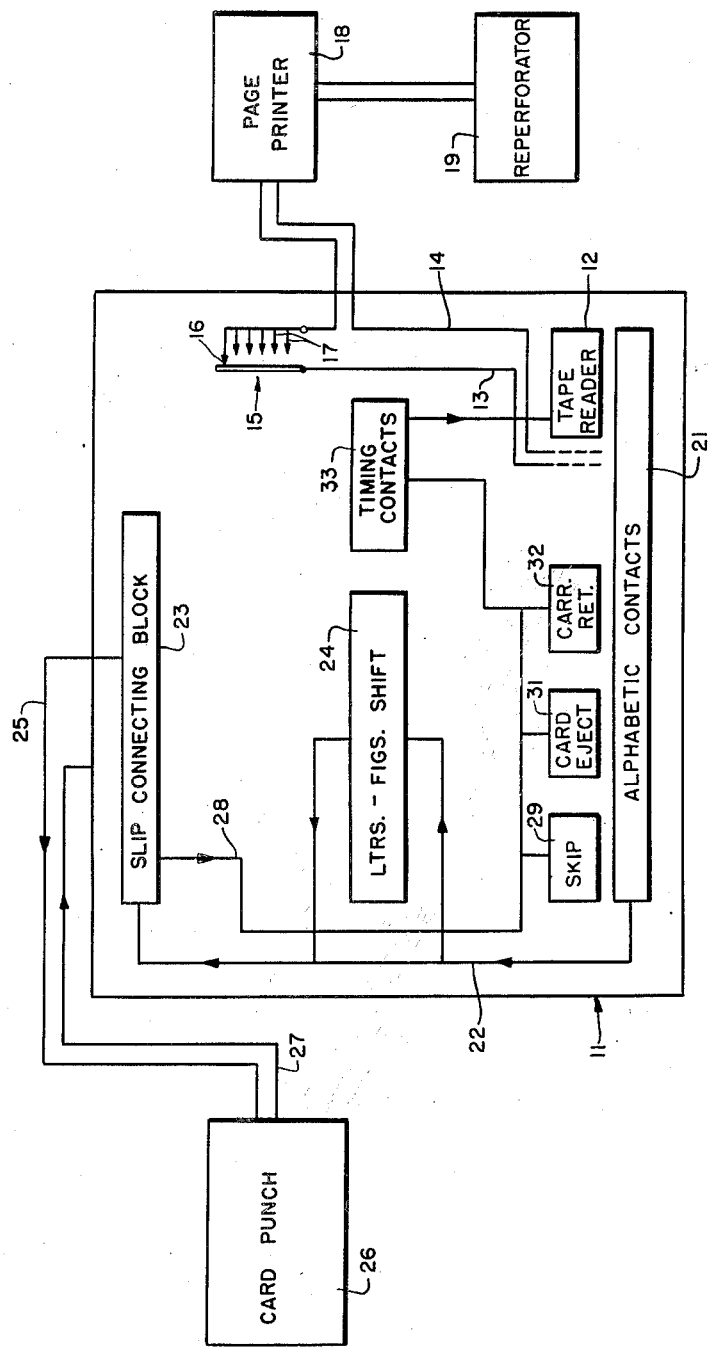
Fig. 1 is a schematic diagram showing the relative arrangement of the various units comprising the system according to the present invention.
Figure 2:
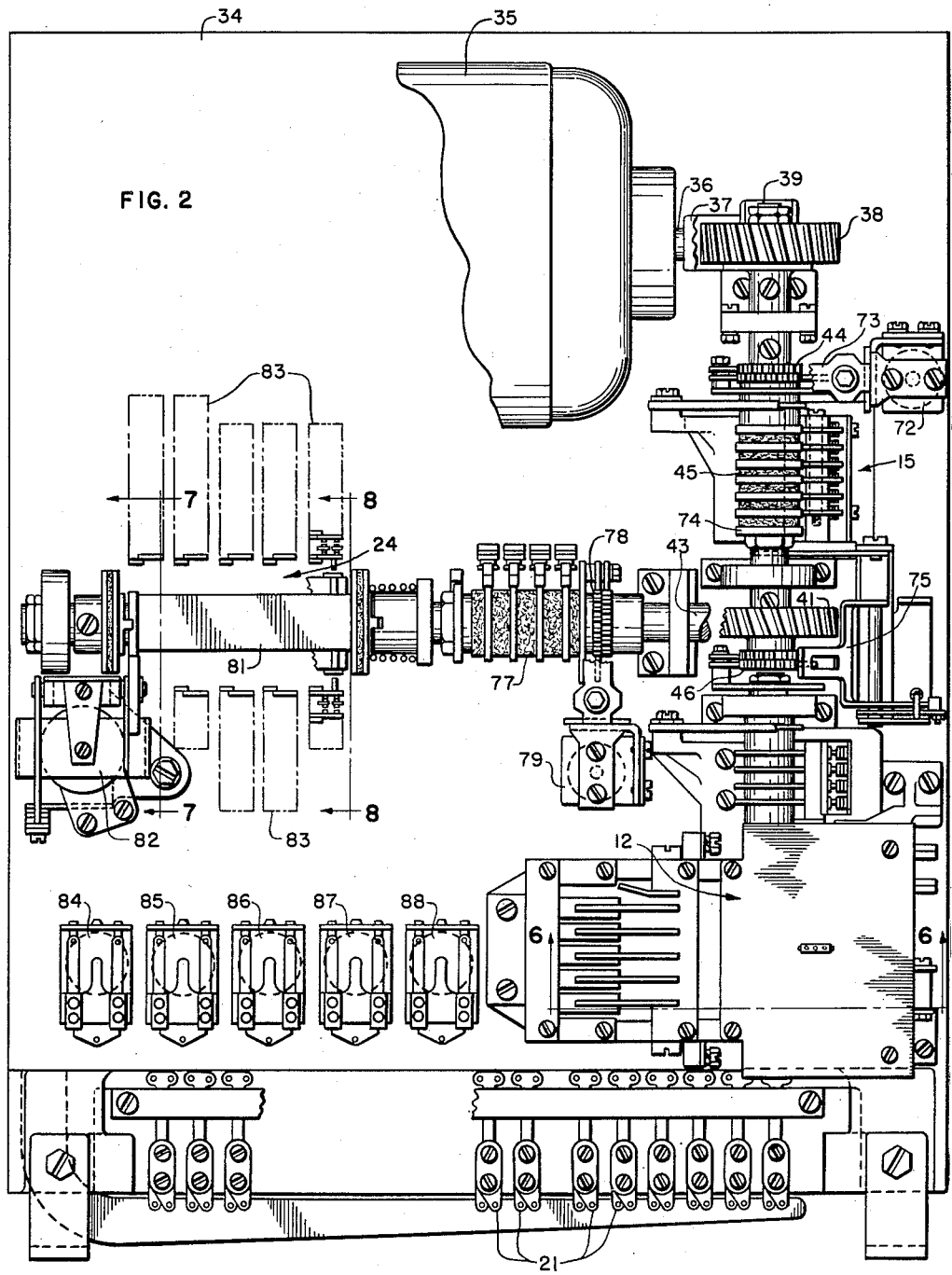
Fig. 2 is a top view of the translating unit according to the present invention.

Having reference to the drawings, Fig. 1 represents a block diagram of the various elements comprising the system according to the present invention. The principal control unit, also identified herein as the translating unit or converter, is indicated by the numeric 11. The tape or record reader is indicated by the numeric 12 and is suitably mounted on the converter 11. The contacts of the tape reader 12 are connected by conductors 13 and 14 to a distributor 15 of the type shown in U. S. Patent No. 1,595,472 having a start-stop contact 16 and a plurality of sequentially operated contacts 17 (one for each unit of the code). Included in series in conductor 14 of the loop circuit are a page printer 18 of the type shown in U. S. Patent No. 1,904,164, and a reperforator 19 of the type shown in U. S. Patent No. 2,042,788.

The tape reader 12, as will appear hereinafter, controls the selective closure of the operating contacts 21. As previously stated, the contacts 21 are connected by individual conductors through a cable 22 either directly to a slip connection block 23 or through a dually positionable switch means of cam controlled "letters-figures" shift contact mechanism 24. From the slip connection block 23 the conductors extend through a cable 25 to the record producing means or card punch apparatus 26 (such as shown, for example in Lasker Patent No. Re. 20,720). Facilities are provided for permitting the card punch unit 26 to, in turn, control the converter unit 11, during certain periods of operation of the punch unit 26. This revertive control is effected over conductors extending through a cable 27, through certain contact terminals in the slip connection block 23, then over conductors in the cable 28 to control relays 29, 31 and 32, cam controlled timing contacts 33 and tape reader 12.

The converter unit 11 is shown in detail in Figs. 2 to 6, inclusive. Mounted on the base 34 is a motor 35 having an armature shaft 36 on which is fixed a pinion 37 meshed with a gear 38 fixed to a cross shaft 39. A gear 41 is fixedly carried on the cross shaft 39 and meshes with a gear 42 fixed to a shaft 43 disposed above and at right angles thereto. Operatively connected to the shaft 39 through the instrumentality of a clutch 44 is a cam sleeve 45 of the distributor 15. Also operatively connected to the shaft 39 through a clutch 46 is a cam sleeve 47 which carries a set of timing cams 48, a spreader cam 49, a reset cam 51, a tape feed cam 52, a sixth pin or tape-out cam 53, and a code bar reset cam 54.

Figure 5:
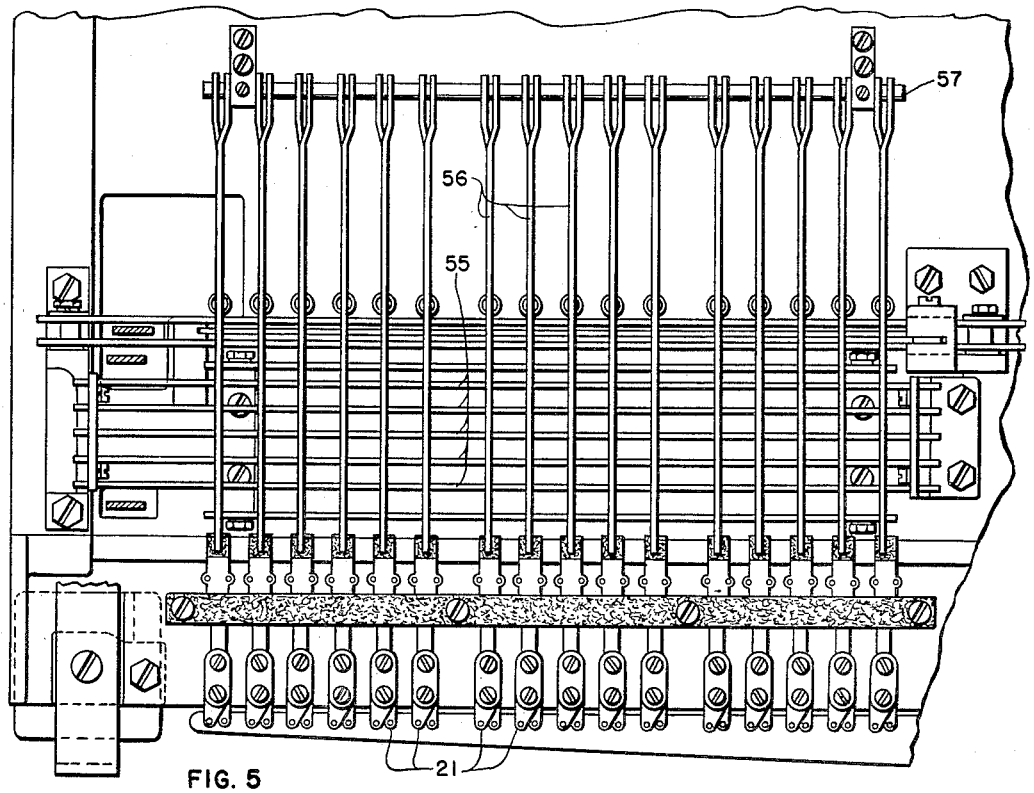
Fig. 5 is a partial plan view of the selector mechanism.
Figure 6:
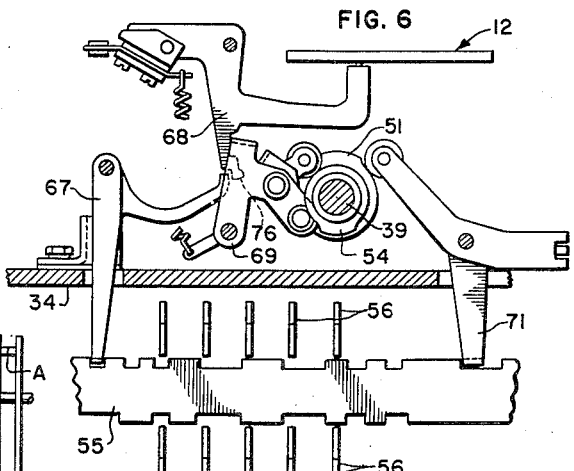
Fig. 6 is a sectional view taken on line 6—6 of Fig. 2.

Positioned in the base of the unit 34 are a plurality of code bars 55 (five in the present instance), Figs. 3, 5, and 6, which are notched along their upper and lower edges to cooperate with a plurality of selectable members 56 disposed on each side of the code bars 55 and pivoted on a common pivot 57. The members 56 are biased toward each other by springs 58 common to each pair. Members 56 normally bear against blades 59 and 61 of a spreader device, shown in Fig. 4. The spreader device comprises a bar 62 slidably carried on a pair of pins 63. The slides 59 and 61 are connected to the bar 62 in parallel motion manner by means of links 64. Fixed to bar 62 is an element 65, the upper edge of which is bifurcated to receive the end of the depending arm of a lever 66 adapted to be operated by the spreader cam 49.

The extremities of members 56 cooperate with individual contacts 21, hereinafter referred to as operating contacts. As shown in Fig. 6, the code bars 55 are articulated to individual bell cranks 67 which cooperate with associated tape sensing levers 68. A bail member 69 functions to operate the sensing levers 68 under the control of the cam 54. Code bars 55 are also notched to cooperate with a reset bail 71 controlled by the reset cam 51.

Upon the energization of magnet 72, the armature 73 thereof is operated to release the clutch 44 to effect the rotation of sleeve 45 to operate the transmitting contacts sequentially. At a predetermined time during the cycle of rotation a cam 74 on sleeve 45 will operate a clutch trip bail 75 to render the clutch 46 effective to rotate the sleeve 47. The cam 54 thereon functions to operate bail 69 to permit simultaneous counterclockwise actuation of tape feeler or sensing levers 68 (as viewed in Fig. 6) for sensing code perforations or indicia in the tape. The code bars 55, normally held in their leftward position, are, in timed relation to the tape sensing operation, released by the reset bail 71 for rightward movement by their individual springs (not shown), under the control of the reset cam 51. Only those code bars 55 will move rightwardly whose bell cranks 67 are not blocked by the ends 76 of feeler levers 68.

In timed relation to the setting of the code bars 55, the cam 49 will operate bail 66 to retract the blades 59 and 61 of the spreader device, thereby permitting springs 58 to draw the members 56 toward the code bars 55. In accordance with well known principles of permutation code selection, one of the members 56 will find an alignment of notches and will therefore be drawn further than the remaining members 56 to effect the closure of its associated contact 21. The closing of contacts 21 selectively in this manner is analogous to such closure by the keys of a keyboard device. It is seen that in accordance with the present invention the contacts 21 are operated automatically under the control of a perforated tape.

The cross shaft 43 is constantly rotating, and rotation is imparted to a timing cam sleeve 77 carried thereon through the instrumentality of a clutch 78 controlled by a clutch release magnet 79. Also mounted on the shaft 43 is a "letter-figures shift" cam 81. Rotation is imparted to the cam 81 through well known friction clutch means under the control of a clutch magnet 82. Associated with the cam 81 are a plurality of banks of contacts 83.

Mounted on the base portion 34 of the converter unit 11 are a plurality of control relays 84 to 88, inclusive. As will hereinafter appear, relay 84 controls the trip operation, which includes the punching, canceling, carriage return, and card eject operations of the card punch apparatus. Relay 85 controls the disconnect operation and is employed when it is desired to disconnect the punch unit from the transmitting unit to effect transmission to the page printer and/or reperforator only. Relay 86 is the key lock relay and is employed to achieve revertive control between the card punch apparatus and the unit 34. Relay 87 controls the skip or tabulating operation of the card punch unit 26 and/or page printer 18. Relay 88 controls the intermediate trip function of the punch unit 26 which is the return of the punch setting carriage to some intermediate point instead of to the beginning of the line or card columns. A more complete understanding of the function and utility of the unit 11 will be had from the ensuing description of the system.

Figure 9:
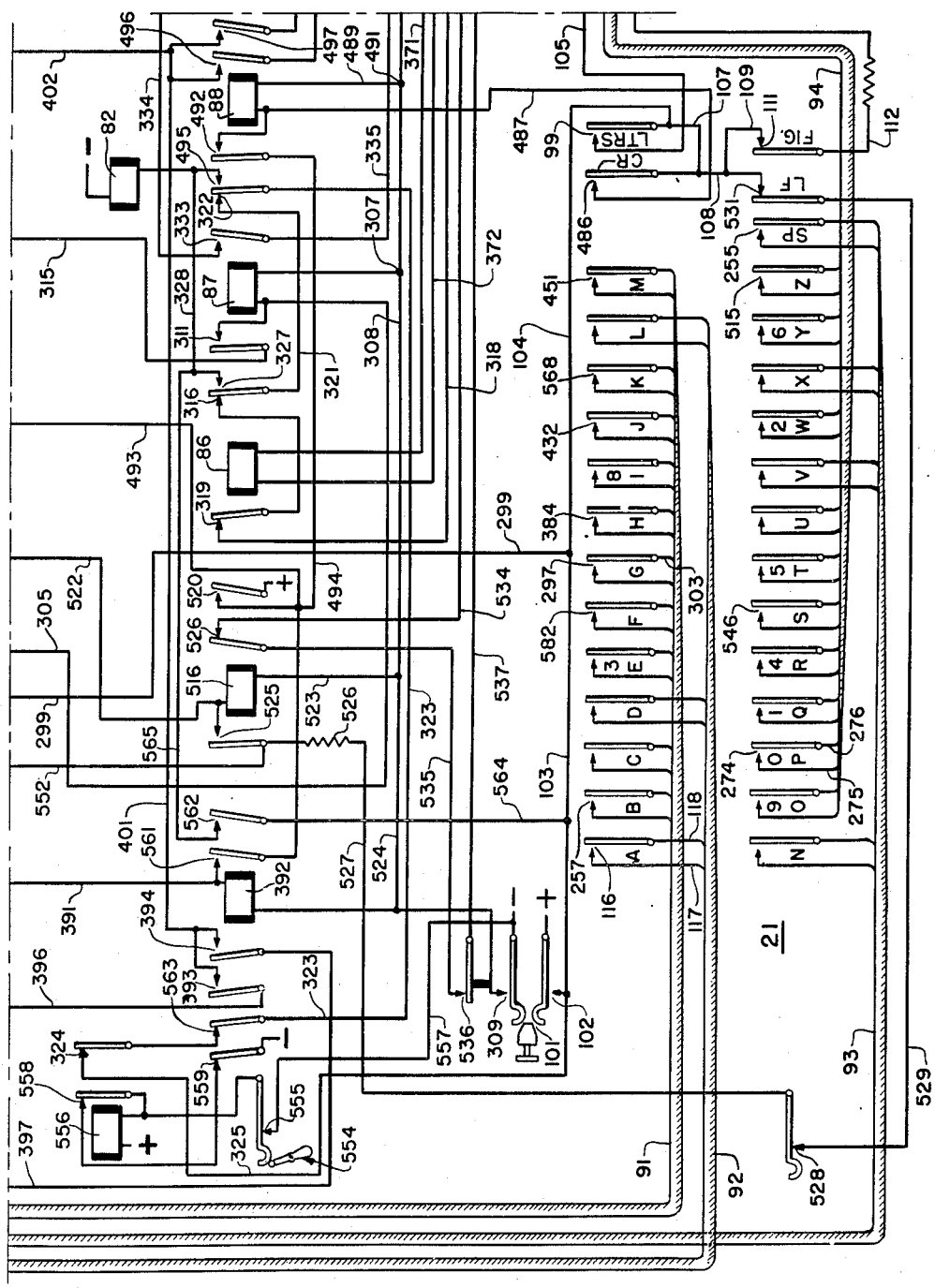
Figure 14:
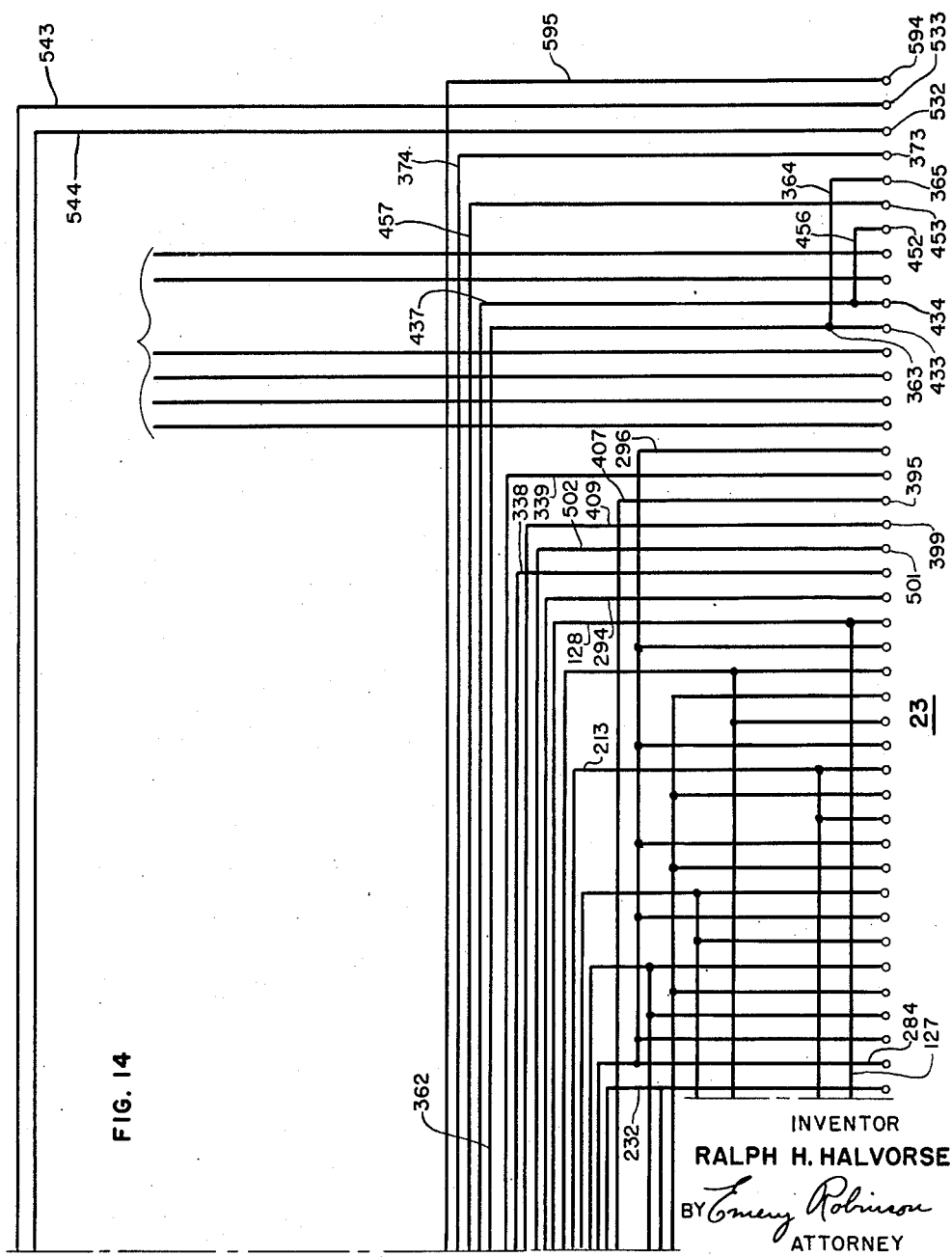

Having reference to the circuit arrangement shown in Figs. 9 to 14, inclusive, which figures are arranged as indicated in Fig. 19, the contacts 21 are shown at the lower portion of Fig. 9. Certain of the contacts 21 are connected to conductors included in a cable 91. Other contacts 21 are connected to cable 92, others to cable 93, and still others to cable 94. Certain other contacts 21 are connected directly to individual conductors, as shown. As may be seen in Figs. 9, 10, 11, and 12, certain of the alphabetic or operating contacts 21 which are connected to conductors in cables 91 and 94, and are thus connected to the "letters-figures shift" contact mechanism 24, and from thence over conductors included in cables 95, 96, and 97 to the terminals of the slip connection block 23. As shown in Figs. 13 and 14 the terminals of the slip connection block 23 are connected to terminals on a terminal means or terminal board indicated generally by the numeric 98.

Depending on the code combinations or indicia sensed in the tape, a pair of operating contacts 21 will close. These contacts will close a circuit either through the letter-figures contacts 24, or directly through slip connection block 23, to the card punch 26; or to one of the function relays, hereinafter described, contained in the unit 11. Assuming, for example, that the "letters" code combination is sensed in the tape, the "letters" operating contact 99 will close. A circuit is thus completed from positive battery on the switch 101, through contact 102 (now closed), over conductors 103 and 104, through contact 99 (momentarily closed), over conductor 105 and through the winding of magnet 82 to negative battery. Magnet 82, upon energization, closes its contact 106 to provide a locking circuit for said battery extending from positive battery at switch 101, through contact 102, over conductors 103 and 104, over conductors 107, 108, and 109, through normally closed contact 111, over conductor 112, through contact 106 and through the winding of magnet 82.

Figure 7:
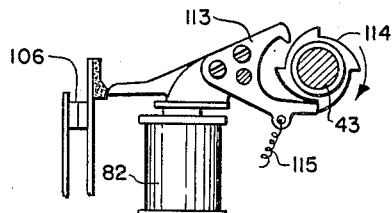
Fig. 7 is a sectional view taken on line 7—7 of Fig. 2.
Figure 8:
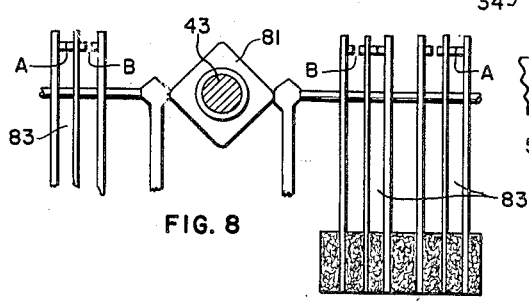
Fig. 8 is a sectional view taken on line 8—8 of Fig. 2.

It is thus observed that upon the momentary closing of contact 99, in response to the sensing of the "letters" shift code combination, the shift magnet 82 will become energized, and locked up upon closure of contact 106. Associated with magnet 82 is an escapement pawl 113 which cooperates with a ratchet wheel 114 fixed to the cam sleeve 81. Upon alternate energization and de-energization of magnet 82 the escapement wheel 114 will rotate in increments of 45°. In Fig. 7, the magnet 82 is shown as energized in response to the reading of a "letters" code combination in the tape, in which condition the locking contact 106 is closed. Now, when the "figures" code combination is sensed by the tape reader 12, the operating contact 111 will be opened to break the locking circuit for the magnet 82 which will thereupon become de-energized thereby releasing pawl 113 under the pull of spring 115 to permit the pawl 113, and hence the cam 81, to rotate 45°, whereupon the "A" contacts of the contact banks 83 are opened, and the "B" contacts are closed (Fig. 8). From the foregoing description it may be seen that the "letters-figures shift" mechanism will remain in "letters" position until a "figures" signal has been sensed, and likewise remaining in a "figures" position until a "letters" signal has been sensed in the tape.

Figure 11:
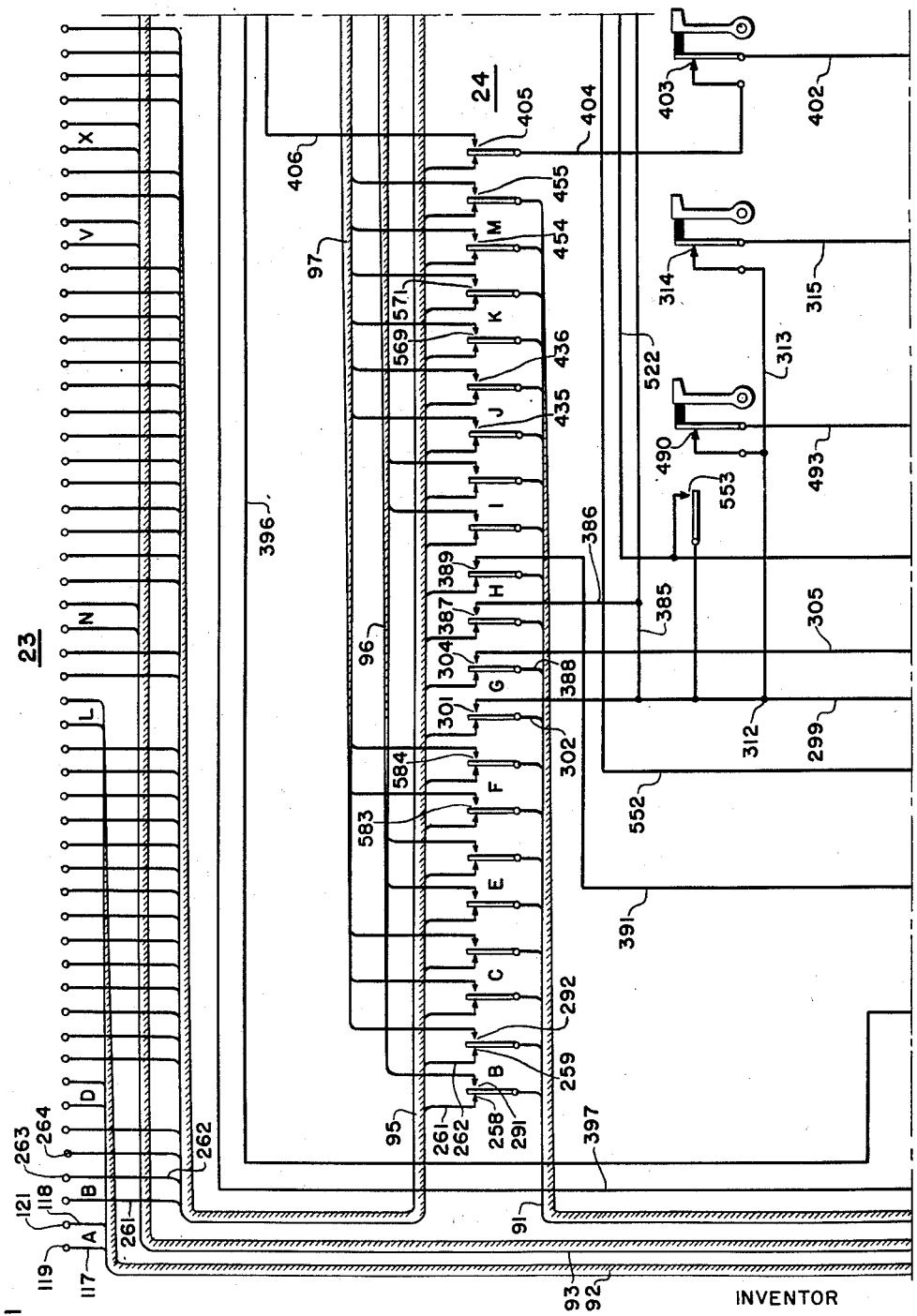
Figure 12:
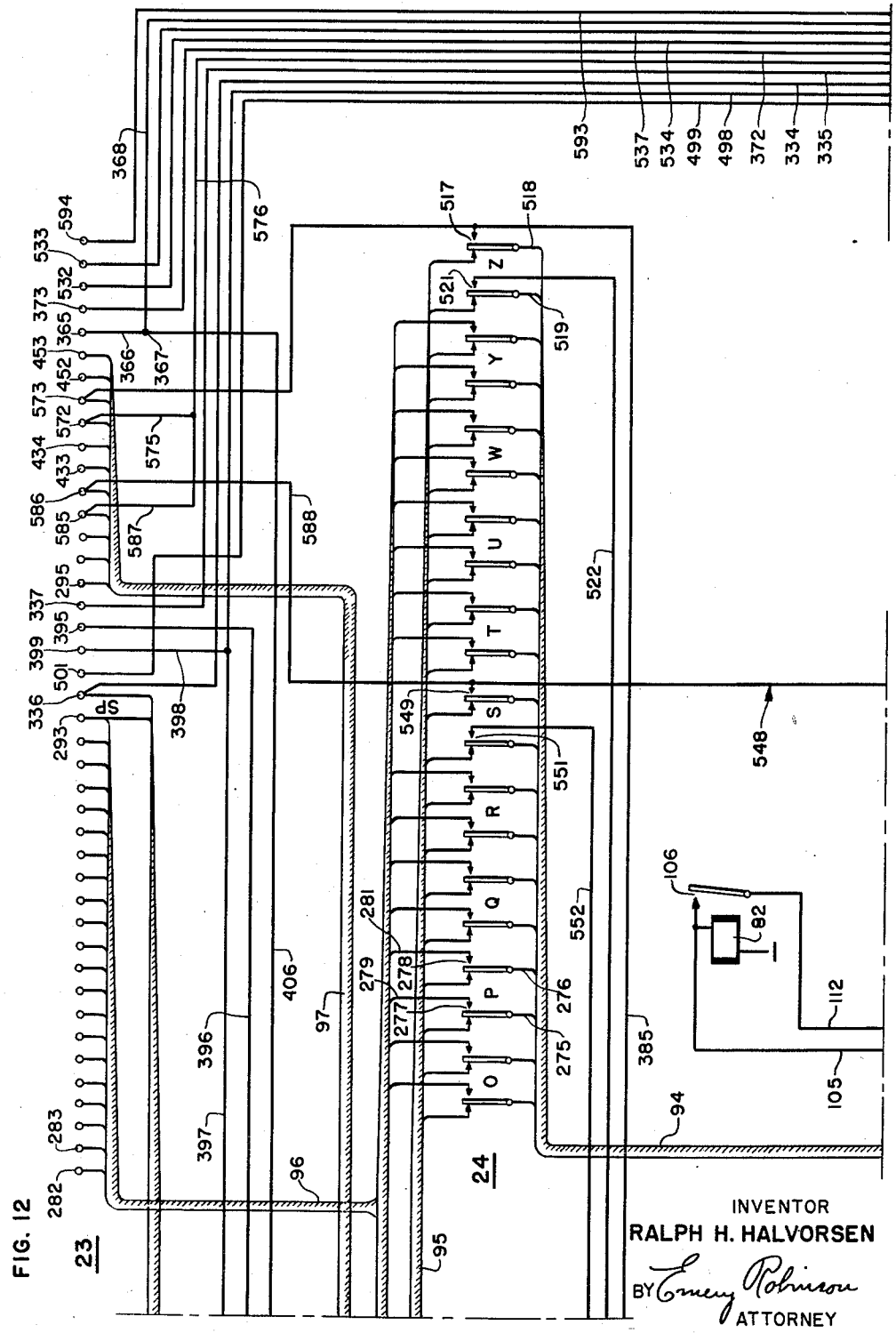

Assuming that the character "A" is sensed in the tape reader 12, the "A" operating contact 116 will close. The contacts 21, of which contact 116 is a part, are so arranged that their conductor pairs, for example, conductors 117 and 118 of contact 116, are connected to corresponding terminals; for example, 119 and 121 of the slip connection block 23. The contacts of the slip connection block 23 shown in Figs. 11 and 12 are connected in well known manner to the contacts of the slip connection block 23 shown in Figs. 13 and 14, respectively. Thus, terminals 119 and 121 are connected to terminals 122 and 123, respectively.

Contact 116 is thus connected, on one side, over conductor 117, through terminals 119 and 122, over conductors 124 and 125 to the terminal 126 of the terminal board 98 (Fig. 13). Contact 116 is connected, on the other side, over conductor 118, through terminals 121 and 123 of the slip connection block 23, then over conductors 127 and 128 to terminal 129 of the terminal board 98. Also connected to terminal 126, as shown in Fig. 15, is a conductor 131, so that the previously described circuit from contact 116 over conductor 117 now extends over conductor 131 (Figs. 15, 17, and 18, respectively), through the winding of relay 132, over conductor 133 (Figs. 18 and 16, respectively), then over conductor 134 (Figs. 16 and 15, respectively) to terminal 135 of the terminal board 98 (Fig. 15). Also connected to terminal 135 is a conductor 136, which over the following described circuit, leads to positive battery. Specifically then, the aforedescribed circuit is traced to positive battery from terminal 135, over conductor 136, through contact 137 of "On-Off" switch 138, over conductors 139 and 141, through contact 142 of a "Repeat" switch, through contact 143 of switch 138, over conductor 144 to terminal 145 (of the terminal board 98) which is normally impressed with positive battery.

Figure 16:
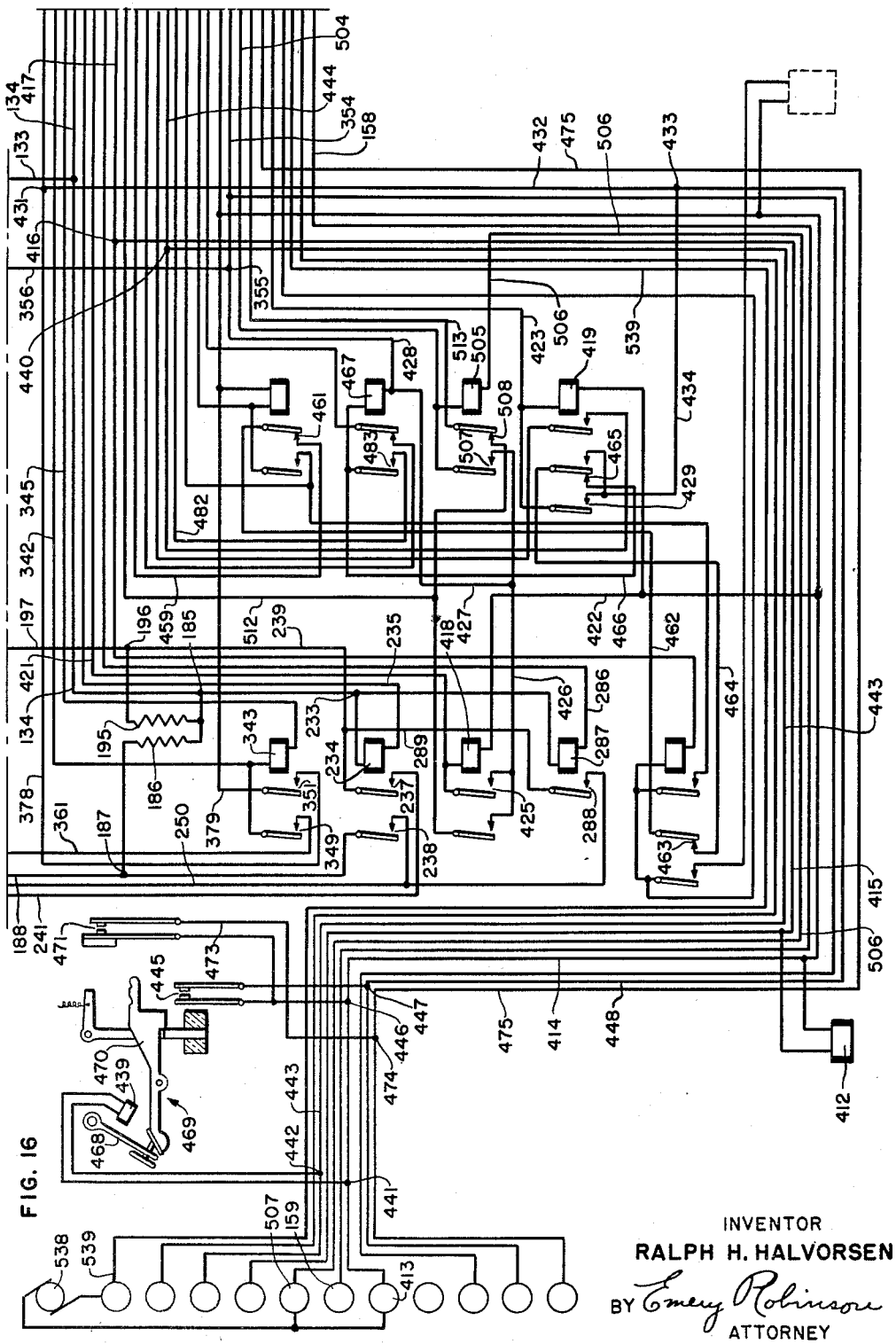

It now remains to trace the aforedescribed circuit, closed by contact 116, from terminal 129 to negative battery. Thus, from terminal 129 (Fig. 15) the circuit is traced over conductors 146 and 147 to junction 148 (Figs. 15 and 17), then through a solenoid 149, over conductor 151, through contact 152 (now closed) of a "Lower Field-Upper Field" transfer relay 153, over conductors 154, 155, and 156 to junction 157 (Fig. 15), then over conductor 158 to negative battery 159 (Fig. 16). Upon the completion of this circuit the solenoid 149 is energized to effect the setting of a punch interponent, as will presently be described.

A tabulating card 161 punched according to the present invention is shown in Fig. 23. Such cards may be punched as indicated at 162, thus employing 45 columns, or they may be punched as indicated in an upper field 163 and a lower field 160 as described in the aforesaid U. S. Patent Re. 20,720. In Fig. 22 is illustrated the train of connections from the solenoid 149 for setting one of the punches. Each solenoid is provided with a plunger 164 therein, arranged to move upward upon energization thereof to transmit movement through a Bowden wire 165 and actuate or rock an associated bell crank lever 166. The levers 166 are all pivotally mounted on a shaft 167 carried by the usual carriage, designated as a whole by the reference numeral 168. Each Bowden wire moves in a flexible casing 169 secured at one end to the associated solenoid housing and at its other end to a casing carrying block 171 on the movable carriage 168. The carriage is arranged for lateral movement in the usual manner along rails (not shown). The step-by-step feed movement of the carriage is controlled by an escapement mechanism such as shown in U. S. Patent No. 1,684,546. Such escapement mechanism includes the usual universal bar actuated by the bell crank levers 166 and operatively connected with escapement pawls which coact with an escapement wheel. A feed pinion is operatively connected to the escapement wheel and meshes with a rack bar secured to the frame of the machine. Each operation of a bell crank 166 is therefore effective to control the feed pawls to bring about a single step or movement of the escapement wheel and permit the carriage to be advanced one space. A tabulating punch machine adapted to be controlled by the present invention is disclosed in U. S. Patent No. 1,780,621.

The bell crank levers 166 are arranged in a row side by side and each is provided with a depending link or actuating device 172 pivotally mounted thereon at 173. Each bell crank lever 166 together with its actuating device 172 is returned to normal position by a restoring spring 174. The carriage is first positioned and a setup is made in one column of a set basket designated as a whole by the reference numeral 175. This basket includes five hundred and forty sliding set pins or plungers 176 arranged in rows, each row having twelve of said pins or plungers 176. Each of these plungers is provided with a locking pin 177 (Fig. 24) designed to engage a locking projection in a slot 178 in a locking slide 179. Each locking slide is pressed to the right to locking position by an individual spring (not shown).

According to the code used, the closure of a contact 21 will result in the operation of one or more solenoids 149 for the operation of one or more punches. As indicated in Fig. 23, the code combination for the character A is 1, 5, and 9 and thus contains three perforations. It has been shown, hereinbefore, how one of the solenoids 149 (namely, 9 or IX) has been operated to produce one of these three perforations. The perforation of the other two holes (namely, 1 and 5) are controlled by the relay 132. It is recalled that as a result of the closure of contact 116 the relay 132 and the solenoid 149 were energized. Relay 132 is provided with contacts 181 and 182. Contact 181 controls the operation of solenoid 183 for actuating the punch in the No. 1 position. Contact 182 controls the operation of solenoid 184 for actuating the punch in the No. 5 position. Thus, solenoids 183, 184, and 149 control the punching of holes in the Nos. 1, 5, and 9 positions, respectively of the code combination identified with the character "A."

The circuit for energizing the solenoid 183 extends from positive battery terminal 145, over conductor 144 (Fig. 15), through contact 143 (now closed), through closed contact 142, over conductors 141 and 139, through contact 137, over conductor 136 to terminal 135 of the terminal board 98, then over conductor 134 (Figs. 15 and 16) to junction 185, then through resistance 186 to junction 187, then over conductor 188 (Figs. 16 and 18) to junction 189, through contact 181 (now closed) of relay 132, to junction 191, then over conductor 192 (Figs. 17 and 18), through the winding of solenoid 183, over conductor 193, through contact 194 (now closed), over conductors 154, 155, and 156 (Fig. 17) to junction 157 (Fig. 15), then over conductor 158 (Figs. 15 and 16) to negative battery 159.

The circuit for energizing the solenoid 184 extends from positive battery terminal 145 (Fig. 15) over the same circuit just described for solenoid 183, up to junction 185 (Fig. 16), then through the resistance 195 to junction 196, then over conductor 197 (Figs. 16 and 18) to junction 198, through contact 182 (now closed), over conductor 199 to junction 201, then over conductor 202 (Figs. 17 and 18) to junction 203, over conductor 204, through the winding of the solenoid 184 over conductor 205, through contact 206, over conductor 154, 155, and 156 (Fig. 17) to junction 157 (Fig. 15), then over conductor 158 (Figs. 15 and 16) to negative battery 159.

Included in the cable 92 are the conductors to the contacts 21 representing characters A, D, and L. From the slip connection block 23 (Fig. 13) the circuit for character D extends over conductors 207 and 208 to terminal 209, on the terminal board 98, and over conductors 211, 212, and 213 (Figs. 13 and 14) to terminal 214 on the terminal board 98. From terminal 209 the circuit extends over conductor 215 (Figs. 15, 17 and 18), through the winding of relay 216, over conductors 133 and 134 to terminal 135 (Fig. 15), then over conductor 136, through contact 137 (still closed), over conductors 139 and 141, through contacts 142 and 143, and over conductor 144 to positive battery 145. Relay 216 upon energization closes its contacts 217 and 218 to effect the operation of solenoids 0 and 3 in addition to solenoid 5, as will presently appear. The solenoid 184 (controlling the No. 5 punch in the upper field) will be energized over the circuit continuing from terminal 214, over conductors 219 and 204, through the winding of solenoid 184, over conductor 205, through contact 206, over conductors 154, 155, 156, and 158 (Figs. 17, 15, and 16) to negative battery 159 (Fig. 16).

The circuit for solenoid 221 (for controlling the 0 punch in the upper field) extends from positive battery 145 over the previously described circuit to terminal 135, then over conductor 134 to junction 185, through resistance 186 to junction 187, then over conductor 188 (Figs. 16 and 18), through contact 218, over conductor 222, through the winding of solenoid 221, over conductor 223, through contact 224, then over conductors 154, 155, 156, and 158 to negative battery 159. The circuit for solenoid 224 extends from positive battery 145 over the previously described circuit to junction 185 (Fig. 16), then, through resistance 195 to junction 196, then over conductor 197 (Figs. 16 and 18), through contact 217, over conductor 225 (Figs. 18 and 17), then through the winding of solenoid 224, over conductor 226, through contact 227, then over conductors 154, 155, 156, and 158 to negative battery 159.

From the slip connection block 23 (Figs. 11 and 13) the circuit for the character L extends over conductors 227 and 228 to terminal 229 on the terminal board 98, and over conductors 231 and 232 (Figs. 13 and 14) to terminal 230 on the terminal board 98. The code combination for character L is 0 and 9. Therefore, it is necessary to operate solenoids 0 and 9 in the upper or lower fields. However, since the transfer relay 153 is still set for upper field operation (as previously described), the present code will be described for upper field operation. The circuit for solenoid 149 (that is, for punch No. 9 in the upper field) extends from positive battery 145 (Fig. 15) over the previously described circuit to terminal 135, from thence over conductor 134 to junction 233 (Fig. 16), then through the winding of relay 234, over conductor 235 (Figs. 16 and 15), to terminal 229. From terminal 229 the circuit extends through terminal block 98 then up and back through cable 92 (passing through contact L) then to terminal 230. From terminal 230 the circuit extends over conductors 236 and 222 (Figs. 15 and 17), through the winding of solenoid 221, then over the previously described circuit to negative battery 159.

Relay 234 upon energizing will close its contacts 237 and 238. The closure of contact 237 will complete a circuit for solenoid 149 from positive battery 145 (Fig. 15) over the previously described circuit to terminal 135, then over conductor 134 (Figs. 15 and 16) to junction 185, then through resistance 195 to junction 196, then over conductor 239, through contact 237 (now closed), over conductors 240 and 147 (Figs. 16, 18, and 17), through the winding of solenoid 149 then over the previously described circuit to negative battery 159 (Fig. 16).

It is noted that relay 234 also closes the contact 238 which completes a circuit over conductor 250 for energizing the "ER" solenoid 241 (or L/ER if switch 150 is set for lower field operation). The ER solenoid 241 is the solenoid that controls the erase function, that is, the function wherein the punches are unlatched to be restored to their unselected position. In the event, one or more nonselected punches are inadvertently set or latched up in the row in which punches are to be operated then the desired punches are selected and held down while the erase bar is actuated to release the nonselected punch and is returned in time to latch up the selected punches. The erase bar is actuated by solenoids 241 or 242 through a Bowden wire individual thereto, and the slope of the portion 243 (Fig. 24) associated with the erase bar is such that only slight depression of the erase bar will actuate the sliding bar 179 sufficiently to release a punch bar locking pin 177.

In a similar manner, the contacts 21 (Fig. 9) identified with characters N, V, X and the function SP (that is, spacing function) are connected to conductors included in cable 93 which extend to terminals in the slip connection block 23 (Figs. 11 and 12). From here the circuits are extended over conductors to terminals on the terminal block 98. The character N terminals on connection block 23 are connected (by conductors which can be readily traced) to terminals 230 and 244 of terminal board 98. Terminal 230 is connected to the "Zero" solenoid 221 (or the corresponding lower field solenoid) and terminal 244 is connected to relay 245 (Fig. 18) over conductor 246, and returning to battery over conductors 247, 133, and 134 over the previously described circuit to positive battery 145. Relay 245 closes contact 260 to control the No. 5 solenoid 184, and contact 248 to control the No. 9 solenoid 149.

The character V terminals on block 23 (Fig. 11) are connected to terminals 209 and 129 on terminal board 98. The code combination for the character V being 0, 3, and 9, the relay 216 is operated to control the 0 and 3 punch solenoids, and the 9 solenoid is operated direct from terminal 129.

The character X terminals on block 23 are connected to terminals 249 and 129 of board 98. The code combination for X being 0, 7, and 9, the relay 251 is operated so that its contact 252 controls the 0 solenoids, and its contact controls the No. 7 solenoids over obvious circuits. The terminal 129 controls the No. 9 solenoid, as previously described.

The "Space" terminals (Fig. 12) on block 23 are connected to the terminals 254 and 135 of board 98. It is noted that terminal 135 is connected over the previously described circuit to positive battery 145 (Fig. 15). Thus, terminals 135 and 254 are connected together through the conductors leading to and from the "SP" contact 255 of the contact group 21 and the circuit is extended from terminal 254 over conductor 256 (Figs. 15 and 17) through the winding of solenoid 270 (Fig. 17), and over conductors 156 and 158 to negative battery 159.

It is thus seen that the contacts 21 identified with single characters or functions are connected through cables 92 and 93 directly to the slip connection block 23. Other contacts 21 which are identified with both upper and lower case characters are also connected through cables 91 and 94 to the slip connection block 23, but not directly. These contacts are connected therewith through the letters-figures shift mechanism 24. Thus, from a small number of contacts 21, the shift mechanism 24 permits circuit connections to a larger number of slip connection terminals in block 23. This is made necessary from the fact that contacts 21 are selected in accordance with the Baudot code wherein certain code combinations represent two characters, one in upper case and one in lower case, and the particular character of the pair is determined by the shift or unshift code combination (that is figures or letters combination) preceding it. The terminals 23 are identified with characters to be represented by a tabulator or business machine code wherein every character has its own distinguishing code combination. Moreover, in accordance with a well known practice in the use of the Baudot code, a certain code combination in the lower case ("letters" or unshift) represents a letter or alphabet character, while in the upper case ("figures" shift) the same code combination represents a predetermined function.

Assuming that the "letters-figures" shift mechanism 24 is in the "letters" position, as shown in Figs. 11 and 12, and that the character B contact 257 of the group of contacts 21 is closed, its conductors are connected through cable 91 to contacts 258 and 259 of mechanism 24. Contacts 258 and 259 are connected to conductors 261 and 262 through cable 95 to terminals 263 and 264, respectively, of the block 23 (Fig. 11). The circuit from terminal 263 then extends over conductors 265 and 266 to terminal 267 on the terminal board 98 (Fig. 13). Also, the circuit from terminal 264 extends over conductors 212 and 213 to terminal 214 on the board 98. From terminal 267 the circuit extends over conductor 268, through the winding of relay 269 (Fig. 18), over conductors 271, 133, and 134 to terminal 135 (Fig. 15) from whence the circuit extends over the previously described path to positive battery 145. From terminal 214 the circuit extends over the previously described path to energize the solenoid 184 from whence the circuit is traced, as also previously described, to negative battery 159 (Fig. 16). Solenoid 184 controls the punching of the No. 5 hole, the code for character B being 1 and 5. Now, to punch the No. 1 hole, the relay 269 is energized to close its contacts 272 and 273. The closing of contact 272 controls the energization of the No. 1 solenoid 183 over the previously described path including conductor 192. Battery is applied over conductor 197. The closing of contact 273 controls the energization of the ER (erase) solenoid 241 for the purpose previously described. Depending on the code sensed in the tape, operating contacts 21 for characters C, E, F, G, H, I, J, K, M, O, P, Q, R, S, T, U, W, Y, and Z will close and with the shift contacts of the mechanism 24 in the "letters" position will operate the necessary relays and punch magnets in the card punch unit (exemplified by the circuit in Figs. 15, 16, 17, and 18) in a manner similar to that described for character "B."

Assuming that the code signal for "Figures"

and the character "P" are successively sensed in the tape, the shift mechanism 24 will be operated to the "Figures" position in the manner previously described (if not already in the "Figures" position). With the shift contacts in the "Figures" (right-hand contacts of shift mechanism 24 closed) and the "P" operating contact 274 closed, a circuit may now be traced over conductors 275 and 276 in cable 94 to the "P" shift contacts 277 and 278 (now closed), over conductors 279 and 281 (in cable 96) to terminals 282 and 283 of the slip connection assembly 23 (Fig. 12). From terminal 282 the circuit extends over conductor 232 (Fig. 14) to terminal 230 of the terminal board 98 (Fig. 13). From terminal 283 (Fig. 12) the circuit extends over conductor 284 (Figs. 14 and 13) to the terminal 285 (Fig. 13) on the terminal board 98.

From terminal 230 (Fig. 15) the circuit extends over conductors 236 and 222 to the "Zero" solenoid 221 (Fig. 17) to control the punching of the "Zero" hole in the tabulating card. The circuit then extends over the previously described circuit to battery 159 (Fig. 16). From terminal 285 (Fig. 15) the circuit extends over conductor 286 (Figs. 15 and 16) through the winding of relay 287 then over conductor 134 and the previously described circuit to positive battery 145. The relay 287 upon energizing closes its contact 298 to complete a circuit for the energization of the "ER" (erase) solenoid 241 over a circuit extending from positive battery 145 over the previously described circuit to the terminal 135, then over conductor 134 to junction 185 (Fig. 16), then through the resistance 195 to junction 196, then over conductors 239 and 289, through contact 288 (now closed), over conductor 290 (Figs. 16, 18, and 17, respectively), through the winding of the erase solenoid 241, then over the previously described circuit to negative battery 159 (Fig. 16). In a similar manner the sensing of codes for Q, W, E, R, T, Y, U, I, and O preceded by the code combination for "Figures" will close circuits to operate the desired relays and solenoids for punching the tabulating codes for the Nos. 1 to 9.

To obtain the most flexible and efficient card punch system, a group of upper case ("Figures") code combinations have been assigned to operate various functions of the card punch, and also to effect revertive control between the card punch and the control unit to allow time for the functions to be completed. Each of these functions is hereinafter described in detail.

When the code combinations "Figs.—B" (upper case B) which comprise the "Erase" signal are sensed in the tape, the "Figs." signal will cause the shift mechanism to be operated to the shift position, as previously described, and the B contact 257 will be closed and a circuit will be extended over conductors in the cable 91 to contacts 291 and 292 (now closed). Contact 291 is connected through cable 96 to the terminal 293 in the slip connection block 23 (Fig. 12) and from thence over conductor 294 (Figs. 14 and 13) to terminal 254 in the terminal board 98 (Figs. 13 and 15). Contact 292 is connected to terminal 295 of the block 23 (Fig. 12) and from thence over conductors 296 and 234 (Figs. 14 and 13, respectively) to terminal 285 of the terminal block 98 (Figs. 13 and 15). As previously described, terminal 254 is connected to negative battery 159 through the winding of solenoid 270, positive battery being derived through closed contact 257 (Fig. 9), terminal 285 (Fig. 15), conductor 286 through relay 287, over conductor 134 and through previously described circuit to positive battery 145. As set forth hereinbefore the solenoid 270 controls the step-by-step spacing function per se. Of course, the spacing operation is also incident to each character punching operation. The "erase" function (controlled by relay 287) is also associated with the "space" function to assure that all punches are released to prevent their operation during a purely space function. Thus, in response to the Figs.—B signal, the erase relay and space magnet are operated to activate the card punch to erase any punch pins set up in the column in which it was resting and to space to the succeeding column.

The card punch unit 26, embodies various function performing devices; such as, carriage return mechanism, skip or tabulation mechanism and trip mechanism. Such functions are disclosed in the aforementioned Patents Nos. 1,684,546 and Re. 20,720.

To achieve the function of skip or horizontal tabulation, the code combinations "Figs." and "G" are sensed in the tape successively. The "Figs." signal conditions the shift mechanism 24 with the right-hand contacts closed, as previously described. When the "G" operating contact 297 is closed, a circuit is established from positive battery on the switch 101 (Fig. 9) through contact 102 (now closed), over conductors 103 and 299, through contact 301 (now closed), Fig. 11, over conductor 302 through cable 91, through contact 297 (now closed) over conductor 303 (in cable 91), through contact 304 (now closed), over conductor 305, through the winding of skip relay 87, to junction 307, then over conductor 308, and through contact 309 to negative battery. To suppress the operation of the tape sensing device during the skip or tabulation time of operation, two methods are herein disclosed. One such method contemplates a maximum fixed time commensurate with the maximum amount of skip or tabulation, while the other method contemplates a variable amount of suppression time commensurate with the actual amount of skip movement or tabulation in each instance.

To function according to the first mentioned method the skip relay 87 closes locking contact 311 to complete a locking circuit for relay 87 extending from positive battery through contact 102 (still closed), over conductors 103 and 299 to junction 312, over conductor 313, through cam controlled timing contact 314, over conductor 315, through contact 311, through the winding of relay 87 to junction 307, then over conductor 308 and through contact 309 (still closed) to negative battery. The timing contact 314 is so timed as to hold the relay 87 operated sufficiently long to allow the page printer and/or the card punch to travel the desired distance to perform the tabulating (skip) function.

The relay 87 upon operating opens its contact 316 to open the energizing circuit for the operating clutch magnet 72 (Figs. 2 and 10), which is traced from negative battery or ground through the winding of magnet 72 (Fig. 10), through the taut tape switch 317, over conductor 318, through contact 319 (now closed) of the key lock relay 86 (Fig. 9), then through contact 316 (now open), over conductor 321, through contact 322 (now closed) of the intermediate trip relay 88, then over conductor 323, through contacts 563 and 324 (now closed), then over conductor 325, through contact 102 to positive battery. Of course, when the relay 87 is de-energized its contact 316 will close to again establish the energizing circuit for the operating clutch magnet 72.

When the relay 87 energizes, it establishes an energizing circuit for the timing shaft clutch magnet 82 from positive battery through the contact 102, over conductor 325, through contacts 324 and 563, over conductor 323, through contact 322 (still closed), over conductor 321, through contact 327 (now closed), over conductor 328, through the winding of magnet 82, to negative battery.

When it is desired to function according to the second method wherein a variable amount of suppression time is desired, the timing contact 314 is so timed as to sufficiently hold the skip relay 87 operated until the key lock or revertive control relay 86 is operated by the revertive control circuit in the card punch, as will be presently described. The contact 333 of the skip relay 87 is connected over conductors 334 and 335 (Figs. 9, 10, and 12) to terminals 336 and 337, respectively, on the slip connection block 23. Thus, when the "Figs.—G" contact 297 is closed, the skip relay 87 will become energized over the circuit previously described. Upon energization, its contact 316 opens to break the circuit for magnet 72 thereby stopping the tape feeding operation. Simultaneously the contact 333 closes to complete the connection between conductors 334 and 335 from the terminals 336 and 337 of the slip connection block 23.

From terminal 336 the circuit extends over conductor 338 (Figs. 14 and 13, respectively) to terminal 135 (Fig. 13) on the terminal board 98. From thence the circuit continues to the battery 145 over the circuit previously described (Fig. 15). From terminal 337 (Fig. 12) the circuit extends over conductor 339 (Figs. 14 and 13) to terminal 341 on the terminal board 98. A conductor 342 connects the terminal 341 (Fig. 15) to relay 343 (Fig. 16). The relay 343 and the skip solenoid 344 (Fig. 17) are energized over the circuit extending from positive battery 145 (Fig. 15) over the previously described circuit to terminal 135, then over the previously described path including the contact 333 of relay 87 (Fig. 9) back to terminal 341 (Fig. 15), then over conductor 342 (Figs. 15 and 16), through the winding of relay 343, then over conductors 345 and 346, through the winding of solenoid 344, then over conductor 347, through contact 348 (now closed), and then over the previously described circuit including conductors 155, 156, and 158 to negative battery 159.

Relay 343 upon energizing closes its contacts 349 and 351 (Fig. 16). Contact 349 provides a locking circuit for relay 343 which extends from positive battery 145 (Fig. 15) as previously described, over conductors 144, through contacts 143 and 142 (still closed), over conductors 141 and 352, to terminal 353, then over conductor 354 to junction 355 (Fig. 16), then over conductor 356, through a contact 357 (Fig. 18) which is controlled by a projection 358 provided on a movable carriage 168 (Fig. 22), then over a conductor 361 (Figs. 18 and 16), through contact 349 (now closed), then through the winding of relay 343 and over the previously described path through the skip solenoid 344 to negative battery 159 (Fig. 16). Thus, relay 343 and solenoid 344 are locked or held energized until the opening of contact 357 by the functional mechanism, as presently described.

By the closing of contact 351 of relay 343 (Fig. 16), a circuit is completed for energizing the revertive control relay 86 (Fig. 9) which extends from positive battery terminal 145 on the terminal board 98 over the previously described circuit to terminal 353 on the terminal board 98, then over conductor 362 (Figs. 13 and 14) to junction 363 (Fig. 14), then over conductor 364 to terminal 365 (Figs. 14 and 12), then over conductor 366 to terminal 367, thence over conductor 368 to junction 369 (Fig. 10), then over conductor 371 (Figs. 10 and 9), through the winding of revertive control relay 86, over the conductor 372 (Figs. 9, 10, and 12) to terminal 373 on the slip connection block 23, over conductor 374 (Figs. 14 and 13) to key lock terminal 375 on the terminal block 98, from thence the circuit extends over conductor 376 (Fig. 15) to junction 377, then over conductor 378 (Figs. 15 and 16), through contact 351 (now closed), over conductor 379 (Figs. 16 and 15) to junction 381, then over conductor 382 to negative battery on terminal 383 on the terminal board 98. Thus, the revertive control relay 86 remains energized over this circuit so long as the contact 351 of relay 343 remains closed; that is, as long as relay 343 remains energized. Moreover, relay 343 remains energized as long as contact 357 is closed, and the latter will remain closed during skip or tabulation operations as disclosed in the aforesaid U. S. Patent No. Re. 20,720.

The revertive control relay 86 (Fig. 9) remains energized as long as contact 351 is closed, and accordingly contact 319 of relay 86 is held open and the previously described circuit for the operating clutch magnet 72 (Figs. 10 and 2) will be broken. Then, as soon as the skip or tabulation operation is completed, the contact 357 will be opened, and as a result thereof, the locking circuit for the relay 343 will be broken, thereby de-energizing relay 343 and solenoid 344 and opening contact 351 to break the circuit for the relay 86, whereupon contact 319 will close and the operating clutch magnet will be re-energized to reactivate the tape sensing device or tape reader 12.

The aforedescribed tabulation or skip function thus exemplifies the feature of revertive control; that is, the converter unit controls initially the skip or tabulation function in the card punch or similar unit, and then the control reverts to the card punch unit, which holds the operation of the converter tape reader suppressed until the skip or tabulation function is completed, whereupon the control again reverts to the tape reader in the converter unit. Following are further examples of revertive control.

According to the present invention, the "Figs.—H" code signals initiate the "trip" function, which causes the card punch to perforate a card, eject the card, return the carriage and erase any punch pins set up in the card punch. When the "Figs." and "H" signals are sensed successively in the tape reader 12, the selector mechanism is activated to effect the closing of the "H" contact 384 (Fig. 9) after the shift-unshift device 24 has been conditioned to the shift position (right-hand contacts closed) by the "Figs." signal. Upon the closing of the "H" contact a circuit is completed from positive battery through contact 102 (Fig. 9), over conductors 103, 299, 385, and 386, through contact 387 (now closed), over conductor 388 through the cable 91, through the contact 384 (momentarily closed), then through cable 91, through contact 389 (now closed), over conductor 391, through the winding of relay 392 and through the contact 309 (now closed) to negative battery. The trip relay 392 when thus energized closes its contacts 393 and 394. Contact 393 is connected to the terminal 395 (Fig. 12) of the slip connection block 23 by the conductor 396 (Figs. 9, 11, and 12), and contact 394 is connected by conductors 397 and 398 to the adjacent terminal 399.

From contacts 393 and 394 (Fig. 9) the circuit also extends over conductors 401 and 402 (Figs. 9 and 11), through timing contact 403, over conductor 404, through contact 405 (now closed) and over conductors 406 and 366 to terminal 365 on the slip connection block 23 (Figs. 12 and 14). From terminal 365 the circuit extends over the previously described path to the terminal 353 (Figs. 13 and 15) on the terminal board 98. From terminal 395 (Fig. 12) the circuit extends over conductor 407 (Figs. 14 and 13) to terminal 408 on terminal board 98. From terminal 399 (Fig. 12) the circuit extends over conductor 409 (Figs. 14 and 13) to terminal 411 on terminal board 98.

Through terminal 411 on the terminal board 98, a circuit is completed for the operation of the trip magnet 412 (Fig. 16) from negative battery 413, over conductor 414, through the winding of magnet 412, then over conductor 415 to junction 416, then over conductor 417 (Figs. 16 and 15) to terminal 411, then over conductor 409 (Figs. 13 and 14) to terminal 399 on the slip connection switch 23, then over conductors 398 and 397 (Figs. 12, 11, and 9) through contact 394, over conductors 401 and 402, through the timing contact 403, over conductor 404, through contact 405, over conductor 406 and 366 (Figs. 11 and 12) to terminal 365 of block 23, then over conductors 364 and 362 (Figs. 14 and 13) to terminal 353 on the terminal board 98, then over conductors 352 and 341 (Fig. 15) through contacts 142 and 143 (still closed) and over conductor 144 to positive battery 145.

At this time relay 418 (Fig. 16) is also energized over a circuit extending from positive battery 145 (Fig. 15) over the previously described circuit to terminal 353 of the terminal board 98, then over conductors 362 and 364 (Figs. 13 and 14) to terminal 365 on the block 23 (Fig. 12), then over conductors 366 and 406 (Figs. 12 and 11), through contact 405 (now closed), over conductor 404, through timing contact 403 (now closed), over conductors 402 and 401 (Figs. 11 and 9), through contact 393 (still closed), then over conductor 396 (Figs. 9, 11, and 12) to terminal 395 on block 23, then over conductor 407 (Figs. 14 and 13) to terminal 408 on terminal board 98, then over conductor 421 (Figs. 15 and 16), through the winding of relay 418, over conductor 422, and conductor 414 to negative battery 413. Relay 418 when operated, closes its contacts 425 to complete a locking circuit for relay 418 extending from negative battery terminal 413 over conductor 414 and 422 through the winding of relay 418, through contact 425 (now closed), then over conductors 426, 427, 428, and 354 (Figs. 16 and 15) to terminal 353 on the terminal board 98, thence over the previously described circuit to positive battery 145.

When the trip magnet 412 is operated and the trip function is thereby initiated, a timing commutator 601 (Fig. 15) will start to rotate to first bridge the brushes 602 and 603 to complete a circuit for the operation of relay 467 (Fig. 16) and the carriage return magnet 493 (Fig. 16) over a path extending from positive source of current 353 (as previously described), over conductors 354 and 428, through the winding of relay 467, then over conductor 466 to contact 465 (normally closed) of relay 419, over conductor 464, through normally closed contact 463, over conductor 462, through normally closed contact 461, over conductor 459 to terminal 458 on the terminal board 98 (Fig. 15), then over conductor 604, through brush 602, over bridging segment 605 (in proper timed relation), through brush 603, over conductors 444 and 443 to junction 442, then through the winding of magnet 439 to junction 441, then to negative battery on terminal 413. The foregoing circuit closures will cause the card to be ejected and the carriage return operation to be initiated.

Associated with the carriage return mechanism is a contact 445 (Fig. 16) which is closed upon initiation of the carriage return function and is opened again at the completion of the carriage return function to control the suppression of operation of the record reader 12 during the performance of the carriage return function. This control is effected through the operation of the revertive control relay 86 (Fig. 9) over a circuit extending from negative source 413 (Fig. 16) to junction 446, through contact 445 (when closed), to junction 447, then over conductors 448 and 432 to junction 431, then over conductors 378 and 376 to terminal 375 (Fig. 15), then over conductor 374 to terminal 373 on the block 23 (Fig. 12), thence over conductor 372 (Figs. 12, 10, and 9), through the winding of the revertive control relay 86, then over conductors 371, 368, and 366 (Figs. 9, 10, and 12) to terminal 365 on block 23, then over conductors 364 and 362 to terminal 353 on the terminal board 98 (Figs. 13 and 15), then over the previously described circuit to positive source 145. As previously described, the energization of relay 86 causes its contact 319 to open to break the circuit to the operating clutch 72 to arrest the operation of the tape reader 12. This condition prevails until the contact 445 (Fig. 16) is opened at the completion of the carriage return function, whereupon the revertive control relay 86 will be deenergized and its contact 319 will close to again re-energize magnet 72.

The timing contact 403 (cam operated), Fig. 11, on the control unit, is for the purpose of timing the trip pulse, as a pulse of too long duration under some circumstances may cause two cards to be ejected. Thus, the opening of contact 403 will result in the breaking of the energizing circuit for relay 418 and the trip magnet 412, having allowed the previously described "trip" operation to be completed, whereupon the contact 445 controlling the revertive control relay 86 will be opened thereby de-energizing relay 86 and again closing contact 319 to initiate operation of the tape reader.

The "Figs.—J" code signals, in the present embodiment of the invention, initiate the carriage return function in the card punch unit. When the "Figs." and "J" signals are sensed successively in the tape reader 12, the contact 432 (Fig. 9) is caused to be closed, and the mechanism 24 is conditioned to the shift position, as previously described. Upon the closing of contact 432, a circuit path is completed between terminals 433 and 434 (Fig. 12) of block 23, over conductors in cable 97 to contacts 435 and 436, respectively, (now closed) in the shift device 24 (Fig. 11), then over conductors in cable 91 to the contact 432 (Fig. 9). From the terminal 433 the circuit path extends over conductor 362 (Figs. 14 and 13) to terminal 353 on the terminal board 98. From the terminal 434 the circuit path extends over conductor 437 (Figs. 14 and 13) to terminal 438 on the terminal board 98.

Thus, upon the closure of the "J" contact 432, a circuit for energizing the magnet 439 (Fig. 16) for controlling the carriage return mechanism will be completed from negative source 413, over conductor 414 to junction 441, then through the winding of magnet 439, to junction 442, over conductor 443 to junction 440, then over conductor 444 (Figs. 16 and 15), through brush 603, over bridging segment 605, through brush 606 to the terminal 438 on the terminal board 98. The circuit then extends over the previously described path through terminal 434 (Fig. 12) and through closed "J" contact 432 back to terminal 433, then over conductor 362 to terminal 353 (Figs. 13 and 15) then over the previously described circuit to positive battery at terminal 145. The closure of this circuit will operate the carriage return mechanism causing the card punch to carriage return and automatically shift from upper to lower field of the card punch field. As previously described, there is associated with the carriage return mechanism, facilities for effecting revertive control, whereby the operation of the tape reader 12 is arrested during the performance of the carriage return operation.

The "Fig. — M" code signals, in the present embodiment of the invention, initiates the dual functions of carriage return and cancelling; that is, this signal will cause the carriage return mechanism of the card punch to function and cause the card punch to carriage return and wipe out all punch pins set up in the punch pin block. When the "Fig." and "M" signals are sensed successively in the tape reader 12, the contact 451 (Fig. 9) is caused to be closed, and the mechanism 24 is conditioned to the shift position, as previously described. Upon the closing of contact 451, a circuit path is completed between terminals 452 and 453 (Fig. 12) of block 23, over conductors in cable 97 to contacts 454 and 455, respectively, (now closed), in the shift means or device 24 (Fig. 11), then over conductors in cable 91 to the contact 451 (Fig. 9). From the terminal 452 the circuit path extends over conductors 456 and 437 (Figs. 14 and 13) to terminal 438 on the terminal board 98. From the terminal 453 the circuit path extends over conductor 457 to terminal 458 on the terminal board 98.

Thus, upon the closure of the "M" contact 451, the circuit for energizing the magnet 439 (Fig. 16) for controlling the carriage return mechanism will be completed, as previously described, from negative source 413, through magnet 439, to the terminal 438 on the terminal board 98, and then through terminal 452 on block 23 (Fig. 12), through the closed "M" contact 451 back to terminal 453, then over conductor 457 to terminal 458 on the terminal board 98 (Figs. 13 and 15), then over conductor 459 (Figs. 15 and 16), through normally closed contact 461, over conductor 462, through normally closed contact 463, over conductor 464, through normally closed contact 465, over conductor 466, then through the winding of cancel relay 467, then over conductors 428 and 354 to terminal 353 on the terminal board 98 (Fig. 15), and then over the previously described circuit to positive battery source 145. The closure of this circuit will activate the magnet 439 and the relay 467 to effectuate the dual function of carriage return and cancellation, as follows:

The magnet 439 (Fig. 16) will attract its armature 468 to initiate operation of the carriage return mechanism exemplified by the numeral 469. At the beginning of the function the latch 470 is operated to permit the revertive control contact 445, to close to operate the revertive control relay 86 (Fig. 9) over the previously described circuit to effect suppression of operation of the record reader 12 as previously described. Moreover, upon the initiation of movement of the carriage return mechanism, the contact 471 (Fig. 16) is permitted to close to complete a circuit for the energization and operation of the solenoid 472 (Fig. 17) over a path extending from negative source 413 (Fig. 16), to junction 446, through contact 471 (now closed), over conductor 473 to junction 474, then over conductor 475 (Figs. 15 and 17), through the winding of solenoid 472, over conductor 479 (Figs. 17 and 15) to junction 481, then over conductor 482 (Figs. 15 and 16), through contact 483 (now closed) of relay 467, then through the winding of relay 428, over conductor 354 (Figs. 16 and 15) to the terminal 353 on the terminal board 98, from whence the circuit path extends over the previously described circuit to positive source 145. The cancel solenoid 472 functions to unlatch the latch members 484 (Fig. 24) to release the punch interponents 485 as the carriage moves along to its beginning of line position. At the completion of the carriage return and cancel functions the contacts 445 and 471 are opened to restore the aforedescribed circuit to normal.

As described hereinbefore, the operation of the "trip" function in the card punch resulted in the perforation of the card, ejection of the card, carriage return and restoration of the punch pins; that is all of the information set upon the punches was eradicated or wiped out. It is sometimes desirable to retain the information fixed for a predetermined portion of the beginning of the card. In this event the "intermediate trip" function is performed wherein the carriage is returned only to a predetermined point, while the remainding or companion functions are performed. In the present embodiment, the "Fig.—CR" code signals initiate the intermediate trip function in the card punch unit. When the "Fig." and "CR" signals are sensed successively in the tape reader 12, the contact 486 (Fig. 9) is caused to be closed, and the mechanism 24 is conditioned to the shift position, as previously described.

Upon the closing of contact 486, a circuit is closed from positive battery, through contact 102 (now closed) Fig. 9, over conductors 103, 104 and 107, through contact 486 (now closed), over conductor 487, through the winding of relay 88, over conductor 489 to junction 491, then over conductor 308 and through contact 309 to negative battery. Relay 88 will lock up through its contact 492 (now closed) over a circuit extending from positive battery, through contact 102 (still closed), over conductors 103 and 299 to junction 312, then through closed timing contact 490, over conductors 493 and 494, through contact 492, then through the winding of magnet 88, over conductors 489 and 308 and through contact 309 to negative battery. The timing cam for contact 490 is so designed as to keep the relay 88 operated sufficiently long to perform the carriage return function on the page printer and the intermediate trip (limited carriage return) function in the card punch.

With the operation of the relay 88, the previously described circuit for the operating clutch magnet 72 (Fig. 10) is opened up at contact 322 (Fig. 9). Upon the closing of a contact 495 of relay 88, a circuit is completed for the operation of the timing shaft clutch magnet 82 over an obvious path comparable to that previously described. Relay 88 also closes its contacts 496 and 497 to close two circuit paths, both extending from terminal 353 (Fig. 13) on the terminal board 98, over conductors 362 and 364 to terminal 365 on the slip connection block 23, then over conductors 366 and 406 (Figs. 12 and 11), through shift contact 405, over conductor 404, through the timing contact 403, over conductor 402, and dividing at contacts 496 and 497 (Fig. 9). From contact 496, one circuit extends over conductors 498 (Figs. 10 and 12) and 398 to terminal 399. From contact 497, the other circuit extends over conductor 499 (Figs. 10 and 12) to terminal 501 on block 23. From terminal 399 the circuit extends over previously described path 409 (Figs. 14 and 13) to the terminal 311 on the terminal board 98. Moreover, from the terminal 501 the circuit extends over conductor 502 (Figs. 14 and 13) to terminal 503 on the terminal board 98. From terminal 503, the circuit path extends over conductor 504 (Figs. 15 and 16), through the winding of relay 505, over conductor 506 to negative source 507. Relay is locked up over the circuit extending from said negative source 507, over conductor 506, through the winding of relay 505, then through locking contact 507 (now closed), then over conductors 427, 428 and 354 to provide source 353 (Fig. 15).

Relay 505 when energized, opens its contact 508 to open the circuit for the solenoid 509 (Fig. 17) which extends from positive source 353, over conductors 362 and 364 to terminal 365, then over conductors 366, 368 and 592 through normally closed switch 591 over conductor 593 to terminal 594, then over conductor 595 to terminal 511 in the terminal board 98 (Fig. 15), over conductor 512 (Figs. 15 and 16), through contact 508 (now open), over conductor 513 and 514 (Figs. 16, 15 and 17), through the winding of solenoid 509 over conductors 477 and 475 (Figs. 17, 15 and 16), to junction 474, then through contact 471 (now closed) to negative source 413. The solenoid 509 thus failing to operate causes the carriage to stop at the intermediate trip stop set at any predetermined point. The trip magnet 412 (Fig. 16) operates upon the establishment of the circuit extending from the terminal 411 (Fig. 15) over the previously described circuit to source 413 (Fig. 16). The closure of the trip magnet circuit will also close the revertive control circuit to operate the revertive control relay 86 as previously described for holding the operating unit at rest (by de-energizing magnet 72) while the intermediate trip function is taking place.

It is sometimes desired to operate the printer 18 only, in which case facilities are provided for blocking or preventing the operation of the punch unit. In the present embodiment, the "Figs.—Z" code signals are employed to initiate this function. With the shift mechanism 24 in the "Figs." position and with the "Z" contact 515 closed, a circuit for energizing the block relay 516 (Fig. 9) is traced from positive source, through contact 102 (still closed), over conductors 103, 299 and 385 (Figs. 9, 11 and 12), through contact 517 (now closed), over conductor 518 in cable 94, through the "Z" contact 515 (now closed), back over conductor 519 in cable 94, through contact 521 (now closed), over conductor 522, through the winding of relay 516, over conductors 523 and 524, and through contact 309 to negative battery. Relay 516 upon energizing closes its contacts 525, 526 and 520. Relay 516 will lock up through its locking contact 525 over a circuit extending from negative battery, through contact 309, over conductors 524 and 523, through the winding of relay 516, through locking contact 525 (now closed), through resistance 526, over conductor 527, through switch 528, over conductor 529, through "LF" contact 531, over conductors 108, 107, 104 and 103, through contact 102 to positive battery.

Contact 526 of relay 516 is connected to terminals 532 and 533 of the slip connection block 23 (Fig. 12), over conductor 534, on one side to said terminal 532, and on the other side over conductor 535, through switch contact 536 (now closed), over conductor 537 to said other terminal 533.

At this point it is mentioned that the terminal 145 on the terminal board 98 (Figs. 13 and 15) derives its positive battery from the generator 538 (Fig. 16) over conductor 539 to terminus 541 (Fig. 15). Terminus 541 is spliced to terminus 542 (Fig. 13) and the power circuit is extended over conductor 543 (Figs. 13 and 14) to the terminal 533 on the slip connection block 23 (Figs. 14 and 12). From thence the power circuit extends over conductor 537, through contact 536 (Fig. 9), over conductor 535, through contact 526, over conductor 534 (Figs. 9, 10 and 12) to the terminal 532 of the aforesaid block 23. The power circuit is then completed to the terminal 145 over the conductor 544 (Figs. 14 and 13). Thus, it is seen that when the contact 526 of relay 516 (Fig. 9) is opened, then the power supply to the terminal 145 (Figs. 13 and 15) is removed or cutoff. Therefore, when it is desired to operate the printer 18 alone (or with the reperforator 19) the relay 516 will be operated to open the normally closed contact 526. In other words, it is seen from the foregoing description that the operation of the block relay will open the generator lead of the card punch, causing the card punch to be inoperative so that when it is desired to transmit telegraph signals only from the transmitting contacts 15 over the signal line 545, the "Fig.—Z" signal in the tape will, when read by the tape reader 12, cause this condition to exist.

As previously mentioned, the "block" relay 516 locks to the normally closed "LF" operating contact 531. It is then apparent that for each line feed signal ("LF") in the tape, the "block" relay 516 will release, placing the card punch in an operative condition for the next line. If it is desired to block card punch operation for the next line, code signals for "Fig.—Z" should precede the information in this line.

Another method of releasing the "block" relay 516 is to provide a shunt circuit therefore, as follows: With the shift mechanism 24 in "Figs." position and the "S" contact 546 (or any other predetermined contact) closed, the circuit is now completed from negative battery through contact 309 (Fig. 9), over conductors 524 and 308 to junction 547 (Fig. 10), over conductor 548 (Figs. 10 and 12), through contact 549 (now closed), over conductors in cable 94 through "S" contact 546 (Fig. 9) back to contact 551 (now closed) (Fig. 12), over conductor 552 (Figs. 12, 11 and 9) bypassing contact 525 (or relay 516) and over previously described circuit, through switch contact 528 (Fig. 9) and "LF" contact 531 to battery. This circuit shunts the winding of the relay 516 causing its release. From the foregoing description it is seen that the card punch can be placed in an unblocked condition from either a line feed signal or a "Figs.—S" signal. A manually operated means for operating the relay 516 (instead of using the signal "Figs.—Z") is provided by the manually operated switch 553, over an obvious circuit.

In the event it is desired to arrest the operation of the converter or control unit upon the completion of a card that is then in the process of preparation, an automatic card out means is provided which comprises an automatic card out switch 554. While the card punch is operating under the control of the converter unit 11 and a card is in the process of being prepared the automatic card out switch will be operated to open the contact 555 which, as will presently appear, will permit the converter unit 11 to continue to control the card punch until the card in process is completed, whereupon the tape reader 12 in the converter unit 11 will automatically cease to operate due to the de-energization of the operating clutch magnet 72.

To effect the automatic card out operation the switch 554 (Fig. 9) is operated to open contact 555. Incidentally, while the contact 555 was closed, a circuit was completed for energizing the automatic card out relay 556 over a circuit extending from negative battery over conductor 557, through contact 555 (while closed), through the winding of relay 556 to positive battery. Relay 556 becomes locked up through its locking contact 558 over a locking circuit extending from positive battery through the winding of relay 556, through locking contact 558 (now closed), then through the contact 559 (now closed) of relay 392 to negative battery.

It will be recalled that during the normal automatic operation of the arrangement according to the present invention the receipt of the "trip" signal ("Figs.—H") not only caused the card punch to perforate a card, eject the card, return the carriage and erase (reset) any punch pins set up in the card punch, but also the operation of the tap reader 12 was suppressed for the duration of the "trip" function. The sequence of operation is substantially the same during the automatic card out operation introduced by the opening of the switch contact 555, except that following the ensuing "trip" operation the tape reader 12 is not automatically reactivated, but its operation remains suppressed until manually restored by the closing of contact 555.

Thus, when the "trip" signal ("Fig.—H") is received following the opening of contact 555, the "trip" relay 392 (Fig. 9) will become energized over the previously described circuit to close its additional contact 561 and 562, and to open its additional contacts 559 and 563. The opening of contact 559 results in breaking the locking circuit for the automatic card out relay 556, whereupon the locking contact 558 for relay 556 is opened (the contact 559 of the trip relay 392 which is in locking circuit for relay 556 is opened momentarily, sufficiently, however, to de-energize relay 556). Contact 563 is also opened to initially break the circuit for the clutch magnet 72, said circuit remaining broken when contact 324 remains open. In the present instance, "trip" relay 392 is locked up through its contact 561 over the circuit extending through contact 561, over the conductor 493, through the timing contact 490 over conductor 299 to negative battery. The purpose of this locking circuit for relay 392 is to assure that the revertive control relay 86 is operated before the relay 392 is released. Relay 392 will be released upon the first revolution of the timing cam shaft. The closing of contact 562 of relay 392 completes a circuit for the timing clutch magnet 82 extending from positive battery, through contact 192 (still closed), over contacts 103 and 564, through contact 562 (now closed), over conductors 565 and 328 and through the winding of magnet 82 to negative battery.

As previously mentioned, the functions initiated by "trip" signal are performed; namely, card perforation, card eject, carriage return and punch reset. However, at the conclusion of these operations the tape reader 12 is not reoperated because the circuit for the clutch magnet 72 is still held open at the contact 324 of relay 556. Resumption of operation of tape reader 12 will be effected when the switch 554 is again actuated to close contact 555 to again re-energize relay 536. The contact 529 on relay 516 is provided for a locking circuit for relay 392 in the event the relay 516 is operated.

Figure 10:
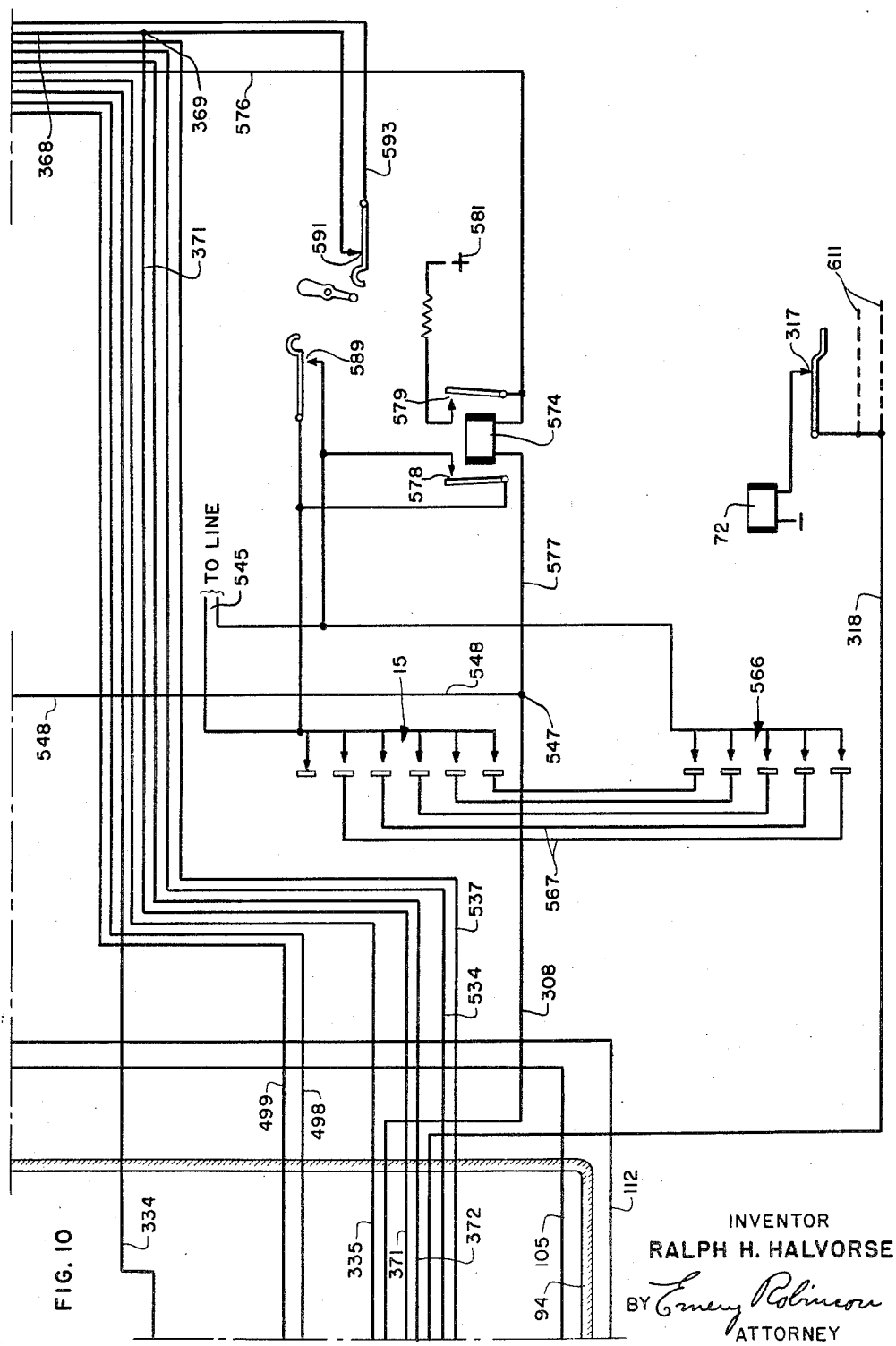

Having reference to Fig. 10, the contacts 566 are associated with the tape sensing or tape reading pins and are operated simultaneously the contacts 566 being closed permutatably according to the code sensed in the tape. Contacts 566 are connected to the transmitting contacts 15 by conductors 567.

The present invention provides means for the automatic control of line transmission. Assuming that the "Figs.—K" signal is assigned for this function, the closure of the "K" operating contact 568 completes a loop circuit over conductors in cable 91 to contacts 569 and 571 (Fig. 11) on the device 24, which are in turn connected by conductors in cable 97 to terminals 572 and 573, respectively, in the terminal block 23 (Fig. 12). Upon the closure of contacts 568, a circuit for the energization of line control relay 574 (Fig. 10) for the automatic control of line transmission, is completed from positive battery through contact 192 (Fig. 9), over conductors 103, 299 and 385 (Figs. 9, 11 and 12) to terminal 573, then over the previously described loop circuit through the operated "K" contact 568 back to terminal 572, then over conductors 575 and 576 (Figs. 12 and 10), through the winding of relay 574, then over conductors 577, 308 and 524, and through closed contact 309 to negative battery.

Relay 574 upon operating will close its contacts 578 and 579. Contacts 579 upon closing completes a locking circuit for relay 574 extending from positive battery 581, through contact 579, through the winding of relay 574 then over the conductors 577, 308 and 524 and through contact 309 to negative battery. Contact 578 when closed (of relay 574) provides a shunt circuit for the line circuit 545 and thus transmission from contacts 15 is prevented as long as relay 574 remains energized.

When it is desired to resume transmission, the code signal; for example, "Figs.—F," assigned to control this operation is sensed by the tape reader, and the "F" contacts 582 (Fig. 9) is closed. Contact 582 is connected by conductors in cable 91 to closed contacts 583 and 584 in the device 24 (Fig. 11) which in turn are connected by conductors in cable 97 to terminals 585 and 586 in the block 23 (Fig. 12). A shunt circuit is completed from positive battery 581 (Fig. 10) through contact 579 (now closed), over conductors 576 and 587, to terminal 585, then through the loop circuit including the "F" contact 582, back to terminal 586, then over the conductors 588, 548, 363 and 524 (Figs. 12, 10 and 9) through contact 309 to negative battery. Thus, the winding of the line control relay 574 is shunted and caused to release, thereby opening its contact 579 to remove the shunt from the signal line 545, and also opening the locking circuit through contact 579.

As may be noted from the foregoing description, the signals "Fig. —K" and "Fig. —F" may be used for automatic control of line transmission by inserting these codes in the tape whenever required; however, these particular codes are not restricted to this application.

A line switch 589 (Fig. 10) is provided to short circuit the transmission line in the same manner as the "L" relay. This switch may be used when no line transmission is desired for a particular application of the present system.

An intermediate margin switch 591 (Fig. 10) is provided so that the operator can place the card punch in condition for intermediate trip or margin trip (also called complete trip, as previously described) as desired without having to use the intermediate margin switch on the card punch. This switch 591 is wired in parallel with the intermediate margin switch on the card punch by connecting one terminal of switch 591 over conductors 592, 368 and 366 (Figs. 10 and 12) to terminal 365, and the other terminal of switch 591 over conductor 593 to terminal 594 on block 23. As previously described, terminal 365 is connected to current source 353 on the terminal board 98. Terminal 594 is connected by conductor 595 (Figs. 14 and 13) to the terminal 511 on the terminal board 98. As previously described the terminal 511 (Figs. 13 and 15) controls the operation of the solenoid 509 (Fig. 17) which in turn controls the intermediate trip function, previously explained.

Figure 17:
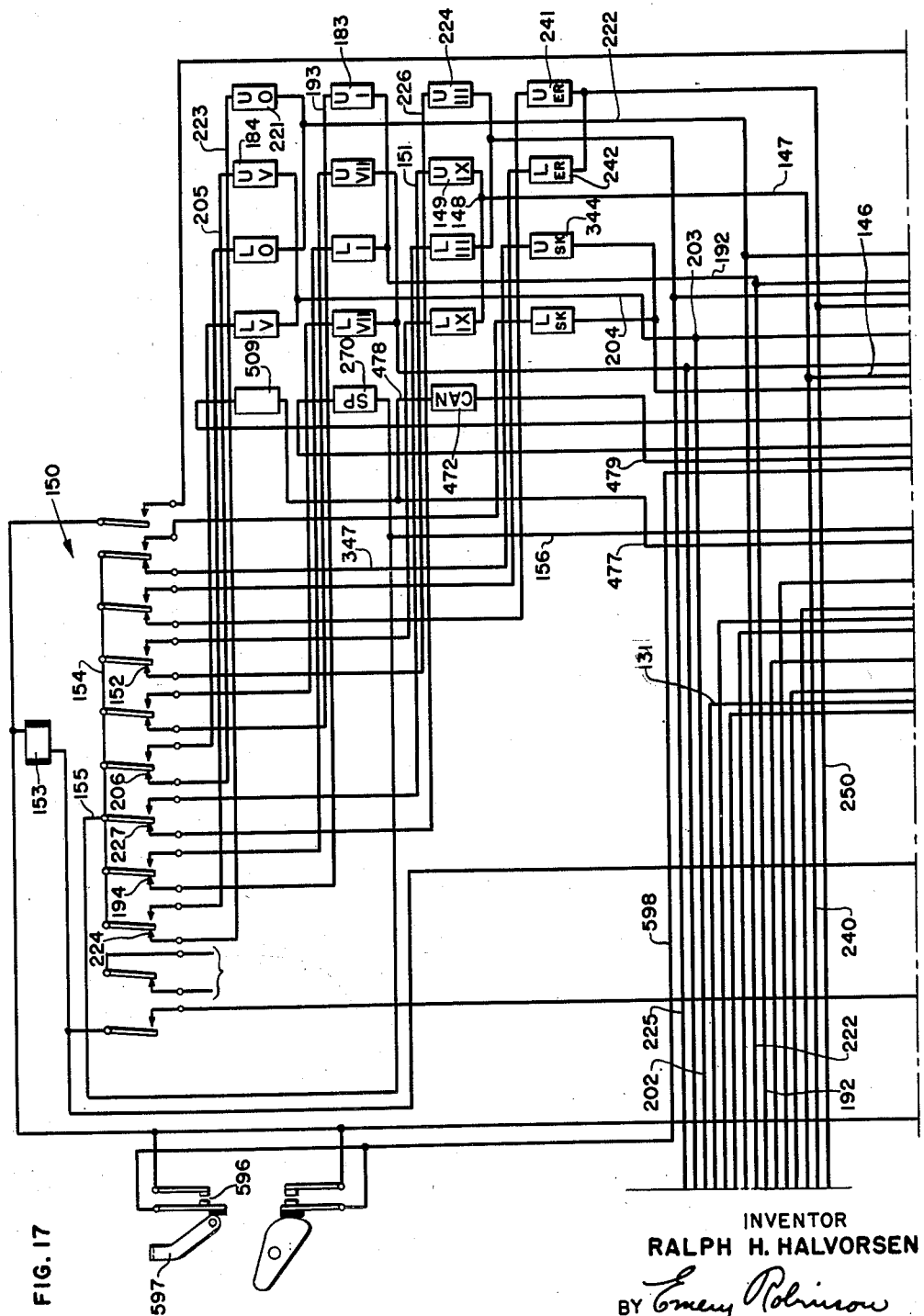

Having reference to Fig. 17, there is shown a contact 596 controlled by a universal bail 597 which is invariably rocked by the bell crank levers 166 shown in Fig. 22. Contact 596 is connected by conductor 598 to the revertive control terminal 375 (Fig. 15) to control the revertive control relay 86 as previously described.

Having reference again to Fig. 10, the magnet 72 may also be controlled over conductors 611 by the tabulator mechanism (not shown) in the printer unit 18. This type of tabulator control is disclosed in the United States Patent No. 2,104,071, issued January 4, 1938, to C. W. Burcky.

While one embodiment of the invention has been disclosed, it will be understood that various modifications may be made therein which are within the spirit and scope of the invention.

What is claimed is:

1. In combination, a record reader, selector mechanism controlled by said record reader, contacts controlled by said selector mechanism, dually positionable switch means, a pair of apparatuses to be controlled by said record reader, independent power supplies for each apparatus, short circuit means for one of said power supplies, and line control relay means for controlling said short circuit means, said line control relay means controlled through said switch means in accordance with the operation of a predetermined one of said contacts, whereby said line control relay means is effective to short circuit said one of said power supplies.

2. In combination, record reader, selector mechanism controlled by said record reader, contacts controlled by said selector mechanism, a pair of apparatuses to be controlled by said record reader, independent power supplies for each apparatus, short circuit means for one of said power supplies, and line control relay means for controlling said short circuit means, said line control relay means controlled in accordance with the operation of a predetermined one of said contacts, whereby said line control relay means is effective to short circuit said one of said power supplies.

3. In combination, record reading means, means for controlling the operation of said record reading means, record producing means under the control of said record reading means, a card out switch, a trip relay means, an automatic card out relay means dually controlled by said switch and said trip relay means, means controlled by said card out relay means for controlling said record reading means, and circuit means effective in response to a condition indicative of record completion for controlling said trip relay means, whereby said card out relay means is effective automatically to arrest the operation of said second recited means.

4. In combination, record reading means, means for controlling the operation of said record reading means, record producing means under the control of said record reading means, a manually operable card out switch, a trip relay means, an automatic card out relay means dually controlled by said switch and said trip relay means, means controlled by said card out relay means for controlling said record reading means, and circuit means operative initially upon the closure of said switch and effective subsequently in response to a condition indicative of record completion to control said trip relay means, whereby said card out relay means is effective automatically to arrest the operation of said second recited means.

5. In combination, a card punching device, means in said device for performing functions other than punching, said means having a predetermined cyclic period of operation, a tape controlled unit for governing said device comprising a control relay means and a tape sensing means, a revertive control means in said unit controlled by said function performing means, and switch means controlled by said revertive control means, said switch means effective jointly with said control relay means to exercise control over said tape sensing means, whereby termination of operation of said tape sensing means is initiated by said control relay means and sustained terminated under the control of said revertive control means until reinitiation of operation of said tape sensing means is effectuated automatically under control of said switch means upon the completion of operation of said function performing means.

6. In combination, tape reading means, electromagnetically operated means for controlling the operation of said tape reading means, selector mechanism governed by said tape reading means, contacts operated by said selector mechanism, apparatus controlled by said selector mechanism, said apparatus including function performing devices individually initiated into operation upon the operation of certain of said contacts identified therewith, relay means effective in response to the operation of said certain of said contacts to terminate operation of said electromagnetically operated means, a revertive control relay controlled by said function performing devices, and switch means controlled by said revertive control relay, said switch means effective jointly with said relay means to exercise control over said electromagnetically operated means, whereby termination of operation of said electromagnetically operated means is initiated by said relay means and sustained terminated under the control of said revertive control relay until reinitiation of operation of said electromagnetically operated means is effectuated automatically under control of said switch means upon the completion of operation of the operated function performing device.

RALPH HENRY HALVORSEN.

REFERENCES CITED

The following references are of record in the file of this patent:

UNITED STATES PATENTS

| Number | Name | Date |
| --- | --- | --- |
| Re. 20,720 | Lasker | May 10, 1938 |
| 2,228,417 | Spencer | Jan. 14, 1941 |
| 2,335,404 | Galster et al. | Nov. 30, 1943 |
| 2,352,952 | Haglund et al. | July 4, 1944 |
| 2,458,144 | Bush | Jan. 4, 1949 |